US00RE42263E

(19) United States
(12) Reissued Patent
Toyama et al.

(10) Patent Number: US RE42,263 E
(45) Date of Reissued Patent: Mar. 29, 2011

(54) ADDRESS CONVERSION UNIT FOR MEMORY DEVICE

(75) Inventors: Masayuki Toyama, Kadoma (JP); Tsutomu Sekibe, Kadoma (JP)

(73) Assignee: Panasonic Corporation, Osaka (JP)

(21) Appl. No.: 11/896,278

(22) Filed: Aug. 30, 2007

Related U.S. Patent Documents

Reissue of:
(64) Patent No.: 6,938,144
Issued: Aug. 30, 2005
Appl. No.: 10/101,268
Filed: Mar. 20, 2002

(30) Foreign Application Priority Data

Mar. 22, 2001 (JP) ..... 2001-083104
Aug. 28, 2001 (JP) ..... 2001-257349
Aug. 29, 2001 (JP) ..... 2001-260250

(51) Int. Cl.
*G06F 12/00* (2006.01)

(52) U.S. Cl. ..... 711/103; 711/206
(58) Field of Classification Search ..... 711/103, 711/206
See application file for complete search history.

(56) References Cited

U.S. PATENT DOCUMENTS 5,404,485 A 4/1995 Ban
5,420,993 A * 5/1995 Smith et al. ..... 711/206
5,446,854 A * 8/1995 Khalidi et al. ..... 711/1
5,485,595 A 1/1996 Assar et al.
5,627,783 A 5/1997 Miyauchi
5,956,756 A * 9/1999 Khalidi et al. ..... 711/207
6,282,624 B1 8/2001 Kimura et al.
6,286,092 B1 * 9/2001 Frank et al. ..... 711/207
6,721,843 B1 * 4/2004 Estakhri ..... 711/103
2002/0013879 A1 * 1/2002 Han ..... 711/103

FOREIGN PATENT DOCUMENTS

| | | | |
|---|---|---|---|
| EP | 610618 | A1 * | 8/1994 |
| EP | 642086 | A1 * | 3/1995 |
| EP | 650124 | A1 * | 4/1995 |
| JP | 6-301601 | | 10/1994 |
| JP | 7-14398 | | 1/1995 |
| JP | 10-494447 | | 2/1998 |
| JP | 11-203191 | | 7/1999 |
| JP | 2000-163314 | | 6/2000 |

OTHER PUBLICATIONS

Korean Office Action, issued in Korean Patent Application No. 10–2007–0102128, dated on Dec. 7, 2007.

Japanese Office Action issued in Japanese Patent Application No. JP 2002–080380, dated May 30, 2007.

* cited by examiner

*Primary Examiner*—Jared I Rutz
(74) *Attorney, Agent, or Firm*—McDermott Will & Emery LLP

(57) ABSTRACT

A memory device with a nonvolatile memory and RAM for accessing the nonvolatile memory is generally provided with a table to convert a logical address to a physical address, however, in the invention, the table is divided to a first table on RAM and a second table on the nonvolatile memory. The first table converts specific bits of the logical address to a first physical address indicating a location of the second table. The second table converts the other bits of the logical address to a physical address of a representative page of pages contained in a storage area corresponding to the logical address. A unit operable to access data (a writing unit operable to, a reading unit operable to, and an erasing unit operable to) reaches a target physical address based on the logical address. Such configuration can reduce the capacity of each conversion table.

23 Claims, 17 Drawing Sheets

1
5
510
PREPARATION UNIT
531 (532)
521 (522) (523)
511
535
515
551
ADDRESS CONTROL SECTION
53
52
51
55
54
D1
D2
D3
D4
2
3
31
32
33
34
WRITE CONTROL SECTION
(READ CONTROL SECTION)
(ERASE CONTROL SECTION)
100 (60) (70)
4
INPUT/OUTPUT CONTROL SECTION
7
DATA INPUT/OUTPUT DEVICE

FIG 11,S1008

ADDRESS CONVERSION UNIT FOR MEMORY DEVICE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an address conversion unit for a memory device provided with a nonvolatile memory such as a flash memory capable of rewriting data therein.

2. Description of Related Art

The portable device for music data and video data has begun using a memory device provided with a nonvolatile memory such as a flash memory. The flash memory allows data to be rewritten, has a high portability, and requires no back-up power such as a battery or the like.

However, the speed of writing data into the flash memory is slower than the speed of transferring data to a buffer in the memory device, whereby a wait time is generated.

A conventional method of efficiently writing data into the flash memory is disclosed in Japanese Laid open Publication No. 06-301601, in which the data is written in parallel into a plurality of physical blocks.

In addition, in order to access a data stored in the flash memory, the physical address of the data should be specified by means of the logical address. For this purpose, RAM in the memory device is provided with a table to convert the logical address of the stored data in the flash memory to the physical address in the flash memory.

In recent years, there is a tendency that information handled by the portable device has increased in volume. And in order to process such mass of information, it is designed so that the memory device increases the storage capacity by adding more nonvolatile memories.

However, the more the storage capacity increases, the larger the table becomes in size. This causes the increase of the RAM's capacity and physical volume.

For example, in a case where the storage capacity of the memory device is 1 gigabyte and the size of the logical block in the memory device is 16 kilobytes, the number of logical blocks formed on the memory device becomes 2^16; therefore, an address to specify a logical block can be represented by 16 bits. That is, the table to convert a logical address to a physical address on a flash memory must have a capacity of 16 bits×2^16=128 kilobytes. Besides, the logical block is a data block specified by the logical address.

Furthermore, the effective writing method for the flash memory has been disclosed in the aforementioned prior art, while no prior art discloses a method for writing data which a reading means can access at high-speed.

In the conventional writing method, for example, where the data is written in consecutive physical blocks from a first to a fifth in order, the data in the fifth physical block can be accessed as follows.

First of all, the reading means reads the first physical block and obtains the second physical block's address stored in the last section of the first physical block, and then reads the second physical block. Likewise, the reading means reads the third physical block after the second physical block, obtains the fourth physical block's address stored in the third physical block, and accesses the fourth physical block. And at last, the reading means obtains the fifth physical block's address stored in the fourth physical block, and accesses the fifth physical block. In such way, in order to access the fifth physical block, the reading means must read all the physical blocks from the first to the fourth. This was a factor to increase the access time.

Additionally, the data stored in the flash memory is to be erased in physical blocks. Therefore, regarding a physical block in the flash memory, when the data in the physical block is erased, if the physical block stores both invalid data and valid data, the valid data stored in the same block is also erased at the same time. To avoid this problem, a data erasing means saves the valid data in the other storage medium, and then erases the data of the physical block, namely, the saving is to be executed in the prior art. Therefore, the saving must be improved more than ever, in order to perform the data erasing with high efficiency.

SUMMARY OF THE INVENTION

The present invention is proposed to settle the abovementioned problems, and has an object to provide a address conversion unit for a memory device that can control the mass of the storage medium by a compact control circuit, and access written data at high speed.

In order to achieve the object, the present invention adopts the following means. A logical address is converted to a physical address using a first table on RAM and a second table on the non-volatile memory.

An access means (a writing means, a reading means, and an erasing means) obtains a first physical address from the first table based on specific bits included in an imparted logical address, and specifies the second table by means of the obtained first physical address. The access means obtains a second physical address from the specified second table based on the other bits included in the imparted logical address, and accesses the nonvolatile memory by means of the obtained second physical address.

The logical address is converted to the physical address by using the above two tables, so that the capacity of the first table can be reduced.

Moreover, in order to promote efficiency to form the logical blocks containing data blocks, and read or erase the logical block, the present invention is provided with a physical block table, a logical block table, an entry counter, and an address register.

The physical block table indicates a state whether a physical block is occupied or blank. The address register indicates a target physical block for writing. The entry counter indicates a data volume of the logical blocks formed on the physical blocks. The logical block table indicates states of the logical blocks.

For example, at the time of forming on the nonvolatile memory the logical blocks specified by the imparted logical addresses, the writing means registers in the physical block table as an occupied block the physical blocks on which the logical blocks are formed, updates the address register based on the pages contained in the logical block, and updates the entry counter based on the data amount of the logical block.

In order to achieve the high speed access to the logical blocks on the nonvolatile memory by the reading means and etc., the writing means, at the time of forming the logical blocks, writes chain information into, for example, a representative page of the pages in the logical block, the chain information is for specifying the physical addresses of the other pages. In the nonvolatile memory, data is written in pages, and a logical block is formed over plural pages.

Moreover, the writing means registers in the second table the information for specifying the physical address of the representative page in the logical block on the nonvolatile memory.

As described above, upon receipt of a request to read the logical block specified by the specific logical address, the reading means reads the information stored in the second table by means of the logical address, and then obtains the physical address of the representative page. According to the obtained physical address of the representative page, the reading means reads chain information which was written into the representative page. The chain information is the physical address of the other page contained in the same logical block as the representative page. After reading the chain information, the reading means obtains the physical address of the other page. According to the obtained physical address of the other page, the reading means reads the chain information written into the other page and then obtains the physical address of the different other page. In this way, the reading means can obtains the physical addresses of all the pages contained in the logical block corresponding to the read request.

Besides, the chain information written in the representative page may be information for specifying physical addresses of all the other pages contained in the same logical block as the representative page. In this case, by reading the chain information on the representative page, the read means can obtain the physical addresses of all the pages contained in the logical block corresponding to the read request.

After obtaining the physical addresses of the pages as mentioned above, the reading means reads the data stored in the pages.

The erasing means erases the data stored in the selected physical blocks as follows. The erasing means refers to the physical block table, the logical block table, and the address register, and then determines the physical blocks on which a small number of the valid logical blocks are formed. The erasing means determines the physical blocks to be erased, and copies the valid logical blocks formed on the erase-target physical blocks to the other physical blocks. And then the erase-target physical blocks are erased. By determining the erase-target physical blocks in this way it is possible to decrease the volume of the valid logical blocks to be copied at erasing the data. Therefore, the data erasing can be processed at high speed.

DESCRIPTION OF THE PREFERRED EMBODIMENTS

Figure 1:
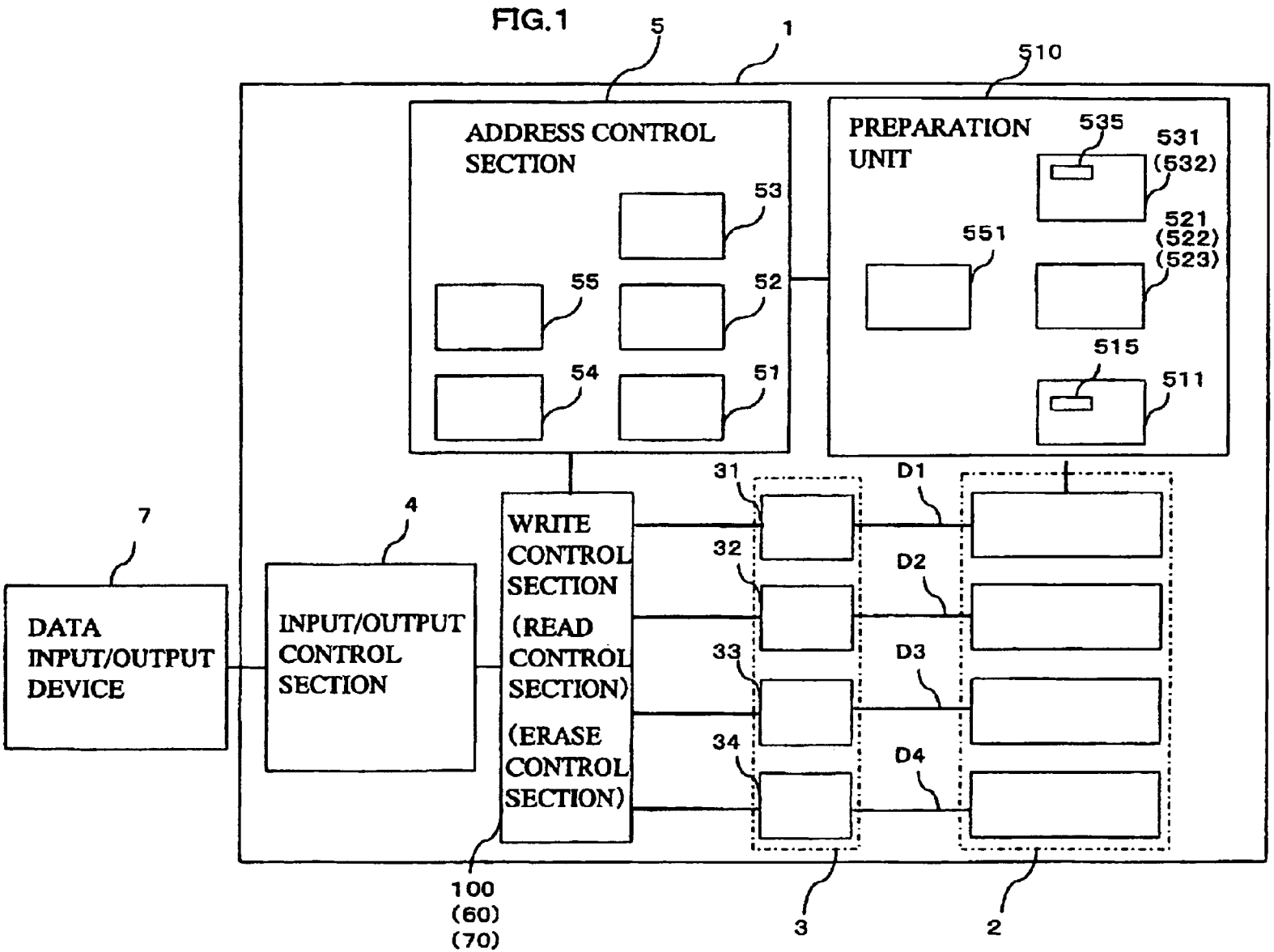
FIG. 1 is a schematic block diagram showing a memory device.
Figure 2:
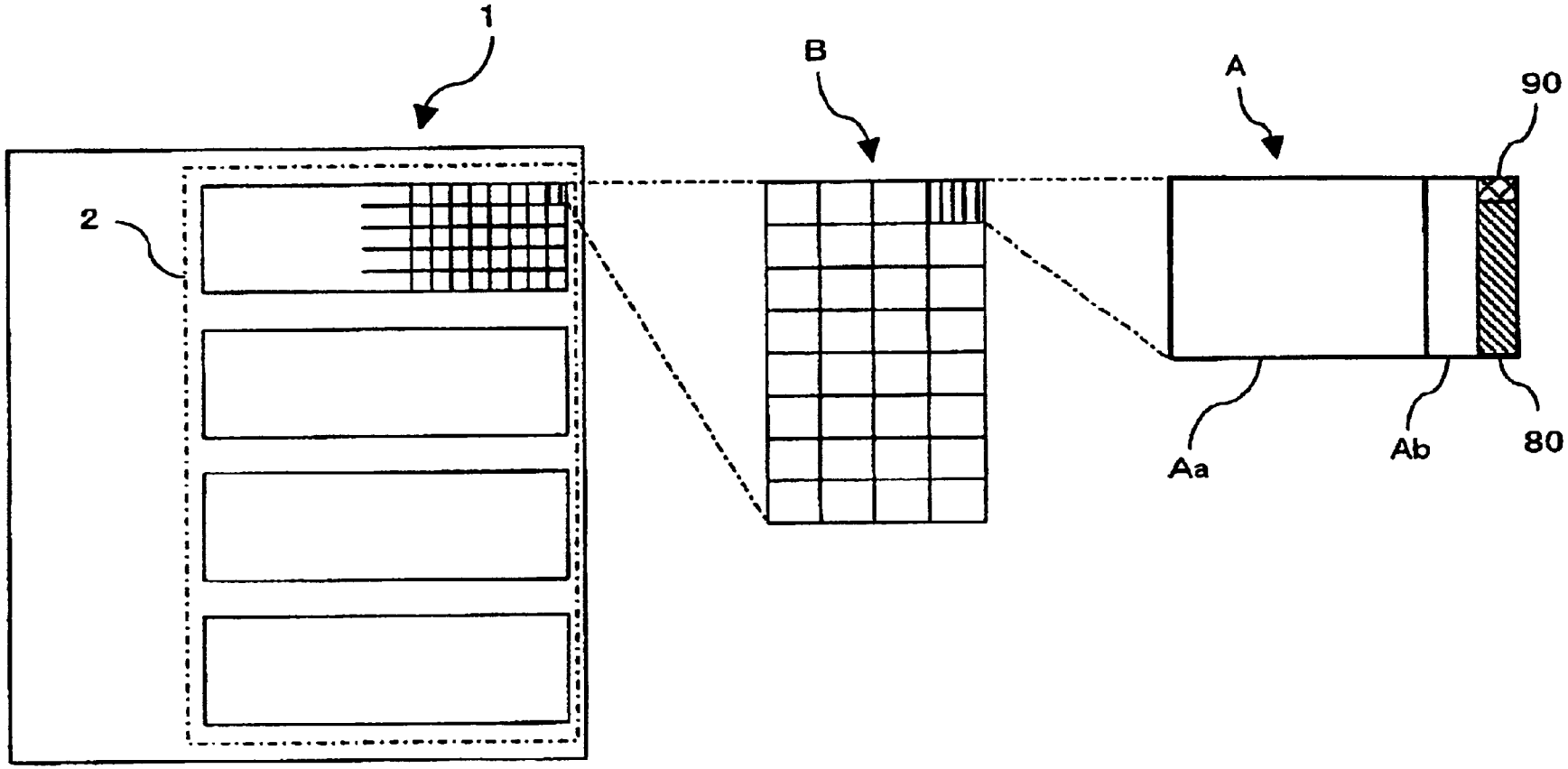
FIG. 2 is an illustration showing a structure of a nonvolatile memory.

A memory device 1 of the present invention, as shown in FIG. 1, is provided with plural flash memories 2, each of which is a nonvolatile memory. Physical blocks B are formed on the flash memory 2, as shown in FIG. 2. The physical block B contains plural pages A. In the flash memory 2, data is written in pages and data is erased in physical blocks.

Besides, in the embodiments of this invention, it is assumed that all the storage capacity of the flash memory 2 is 1 gigabyte, the storage capacity of the physical block B is 16 kilobytes, and the storage capacity of the page A is 512 bytes. But respective storage capacities of the flash memory 2, the physical block B and the page A are not limited to those values.

(First Embodiment)

[Operations at the Time of Power-On]

Figure 3:
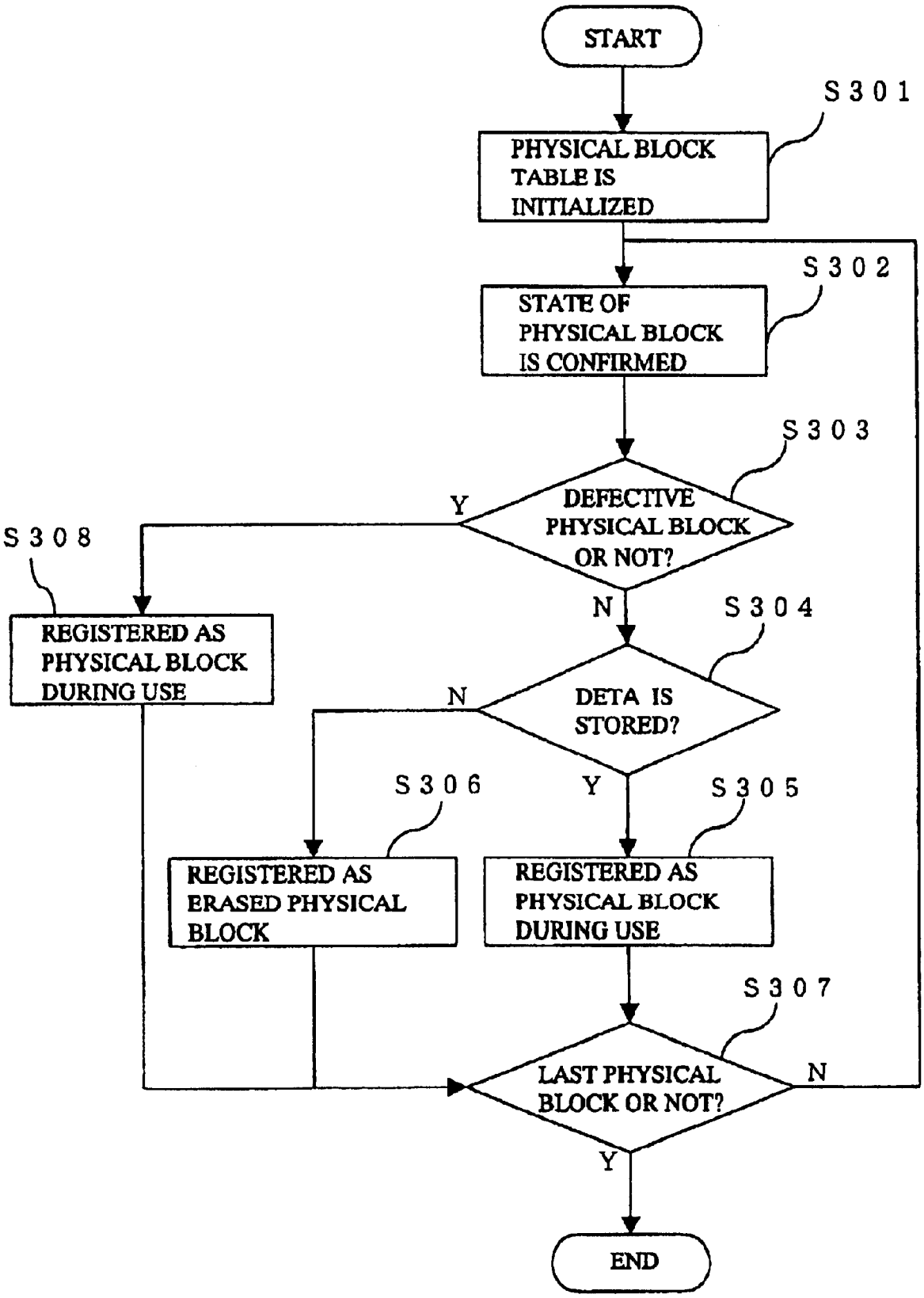
FIG. 3 is a flowchart showing a concrete example of a procedure for preparing a physical block table.

When power is turned on in the memory device 1, a physical block table preparation means 521 provided to a preparation means 510 prepares a physical block table 52. And the physical block table 52 is prepared on RAM of an address control means 5 provided to the memory device 1. FIG. 3 shows an example of steps for preparing the physical block table 52.

First of all, the physical block table preparation means 521 initializes all values in the physical block table 52 (S301 in FIG. 3). By the initialization in this embodiment, all the values of the physical block table 52 are changed to 'blank' so as to represent that each physical block has no data.

Subsequently, the physical block table preparation means 521 actually confirm a state of a specific physical block B (S302 in FIG. 3). The state of the specific physical block B can be known by confirming a specific page A contained in the specific physical block B shown in FIG. 2. And the specific page A is a page to write data therein first under a initial state.

In the first step, the specific physical block is judged whether or not to be defective. For this judgment, the physical block table preparation means 521 functions as a defective physical block judgment means 522. The defective physical block judgment means 522 confirms whether it is possible to write data normally based on the specific page A contained in the specific physical block B. When any data cannot be written into the physical block B because of damage or the like, the physical block B is determined as a defective physical block (S303 in FIG. 3).

If it is determined that a confirmed physical block B1 is not a defective physical block, the physical block table preparation means 521 judges whether Page A contained in the physical block B1 stores data or not (S304 in FIG. 3). If it is determined that Page A stores data, the physical block table preparation means 521 determines that the physical block B1 is in use. The physical block table preparation means 521 registers the physical block B1 as 'occupied' in the physical block table 52 in FIG. 4 (S305 in FIG. 3). If it is determined that Page A contained in the physical block B1 stores no data, the physical block table preparation means 521 determines that the target physical block B1 is 'blank', which represents the state of the physical block that data can be written therein. The physical block B1 is registered as 'blank' in the physical block table 52 (S306 in FIG. 3).

After the 'occupied' or 'blank' state is registered in the physical block table 52 as described above, the physical block table preparation means 521 judges whether or not the physical block B1 is the last physical block B (S307 in FIG. 3). If it is determined that the physical block B is not the last physical block B, the physical block table preparation means 521 confirms a state of a next physical block B which has not been confirmed (S302 in FIG. 3). If it is determined that the physical block B1 is the last physical block B, the physical block table preparation means 521 terminates the preparation of the physical block table 52.

Figure 4:
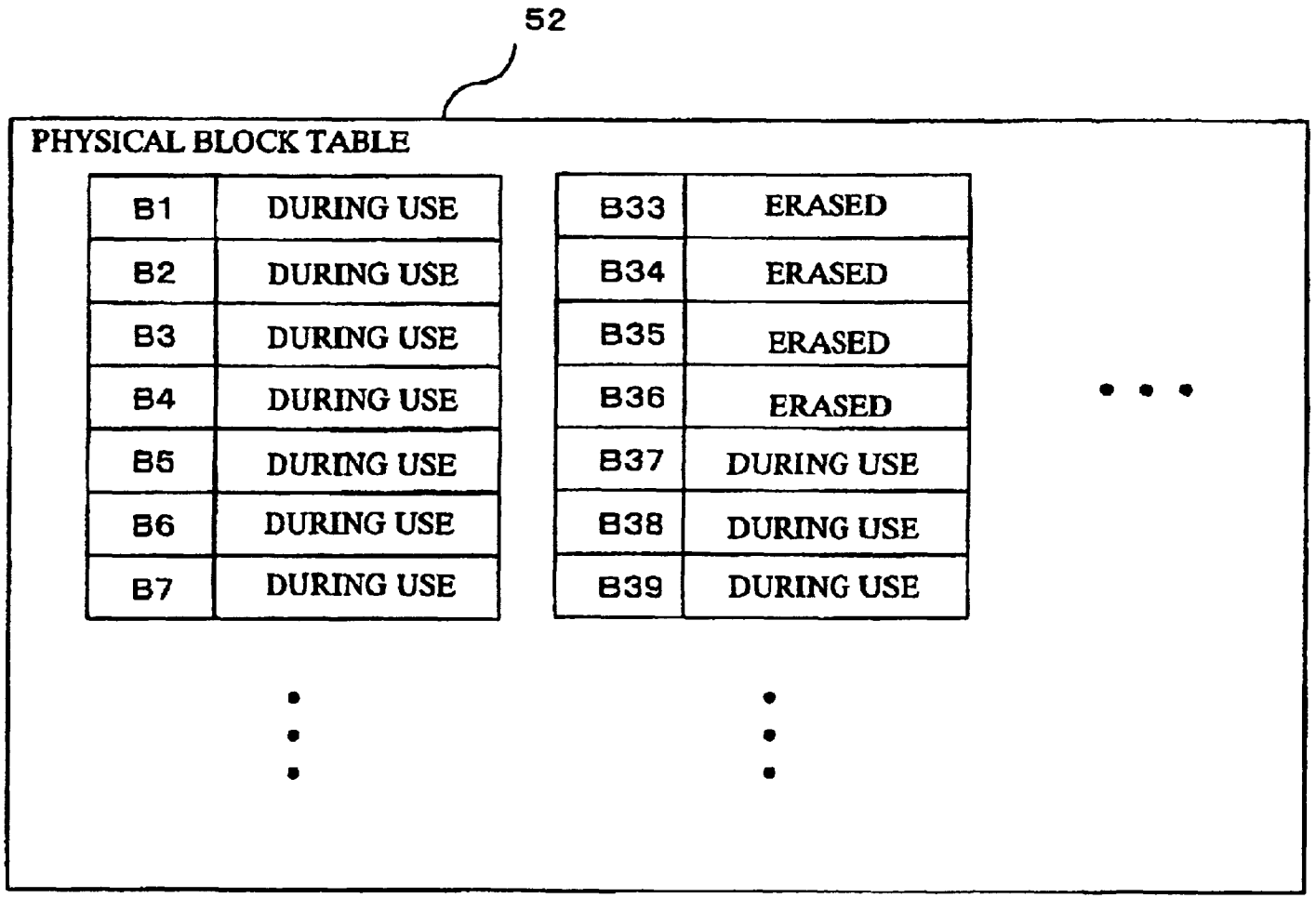
FIG. 4 is an illustration showing a physical block table.

The above-mentioned steps prepare the physical block table 52 shown in FIG. 4, for example. FIG. 4 shows that each state of physical blocks B1, B2, . . . , is 'occupied' or 'blank'.

When it is determined that the physical block B is defective, the defective physical block judgment means 522 may register the physical block B as 'occupied' in the physical block table 52 (S308 in FIG. 3).

That is, the state of the defective physical block is set to an 'occupied' state in the physical block table 52. For this setting, the physical block table preparation means 521 functions as a use state setting means 523.

The physical block B registered as 'blank' in the physical block table 52 will be selected as an available physical block to which data can be written, at the writing by a writing means 100, which will be described later. If a defective physical block is registered as 'blank' tentatively, the writing means 100 may select the defective physical block as the available physical block. In such case, the writing means 100 may determine the selected physical block to be a block to which the data cannot be written, and then select another physical block B as an available block. However, such steps increase the time for the writing.

The defective physical block can be excluded from the available physical blocks by registering this block as 'occupied' in a way described above. In result, even in a case of the nonvolatile memory used on the assumption that the defective physical block exists, it is possible to shorten the time for writing.

When power is turned on in the memory device 1, a logical block table 53 is prepared on RAM of the address control means 5 in addition to the physical block table 52. This preparation is executed by a logical block table preparation means 531 provided to the preparation means 510. The logical block table 53 may be prepared at the same time as the physical block table 52 is prepared, or, after or before the physical block table 52 is prepared.

Figure 5:
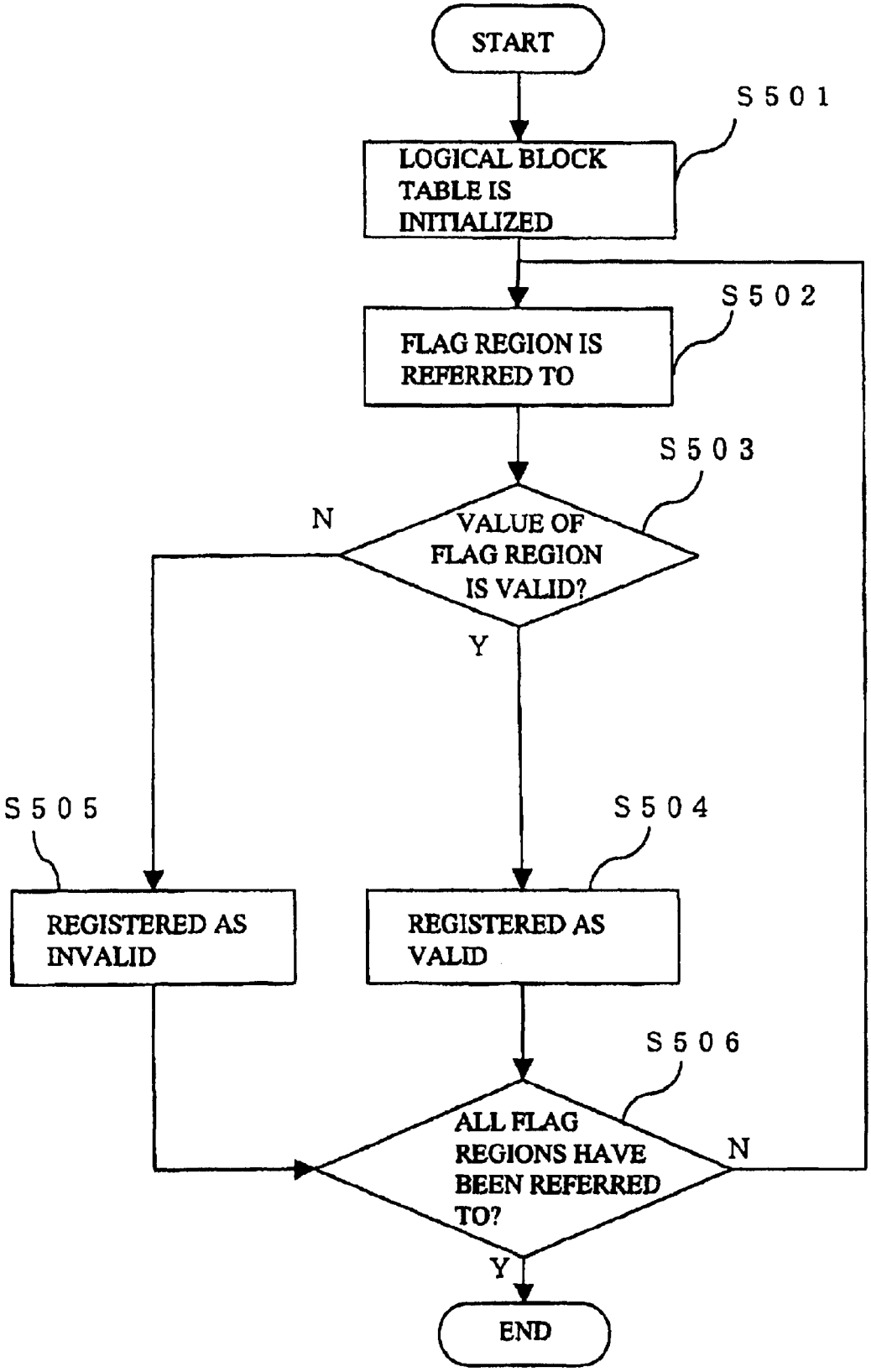
FIG. 5 is a flowchart showing a concrete example of a procedure for preparing a logical block table.

The logical block table 53 is a table representing a state of data in a logical block C, namely, whether data stored in the logical block C is 'valid' or 'invalid'. The logical block C is a data block indicated by a logical address, and formed over one and more physical blocks B. FIG. 5 is a flowchart showing an example of steps for preparing the logical block table 53.

As shown in FIG. 5, the logical block table preparation means 531 initializes the logical block table 53 (S501 in FIG. 5). By the initialization, all the values in the logical block table 53 are changed to values representing 'invalid' for example.

Subsequently, the logical block table preparation means 531 look up a value in a flag section 90 provided to a management area Ab in a specific page A having a physical address of which the specific number of bits is '01000' (S502 in FIG. 5). Note that, in the memory device 1 of this embodiment, a second table 80, which will be described in details later, is stored in the management area Ab contained in the page A; the page A is indicated by the physical address of which the specific number of bits is '01000'. And the management area Ab is provided with the flag section 90 for storing management information representing that the second table 80 is valid or not. Namely the logical block table preparation means 531 looks up only the value in the flag section 90 of the page A storing the second table 80.

The value in the flag section 90 indicates the state (valid or invalid) of the second table 80. The second table 80 is stored in the management area Ab in which the flag section 90 is stored. At this time, the logical block table preparation means 531 does not need to look into all the flag sections 90 in the specific pages A indicated by physical addresses of which the specific number of bits is '01000'. For instance, the logical block table preparation means 531 may look into only the flag sections 90 in the pages A contained in the physical blocks B; the physical blocks B having a physical address including the specific number of bits, '0100', and being registered as 'occupied' in the physical block table 52. According to such configuration, it is possible to achieve the high-speed processing for preparing the logical block table.

At looking in the flag section 90, the logical block table preparation means 531 judges whether the value of the flag section 90 is valid or invalid (S503 in FIG. 5), that is, the flag section 90 represents whether the second table 80 is valid or invalid. When it is determined that the value of the flag section 90 is valid, the logical block table preparation means 531 obtains a second physical address Ca registered in the second table 80 and then registers as 'valid' the logical block C specified by the obtained second physical address Ca in the logical block table 53 (S504 in FIG. 5). The second physical address Ca is information for obtaining a physical address of a specific page A (a representative page ar) contained in the logical block C.

On the other hand, if it is determined that the value of the flag section 90 is invalid, the logical block table preparation means 531 goes to step S505 instead of step S504.

In this step, it is confirmed whether or not there is any unconfirmed flag section 90 (S505 in FIG. 5).

If there is an unconfirmed flag section 90, the logical block table preparation means 531 looks in the unconfirmed flag section 90 (S502 in FIG. 5). In the same way, the logical block table preparation means 531 looks in all the flag sections 90.

Figure 6:
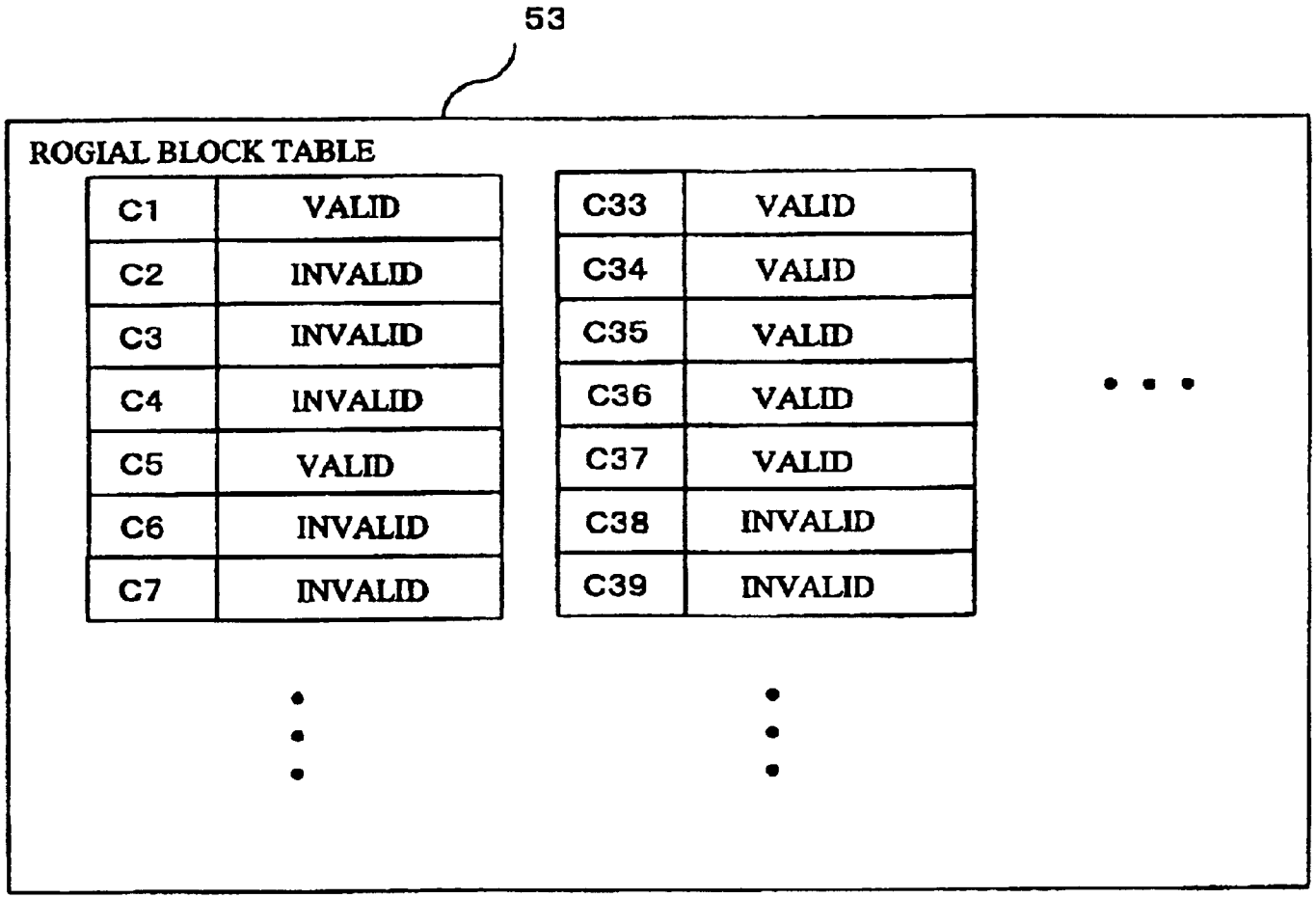
FIG. 6 is an illustration showing a logical block table.

The above-mentioned steps prepare the logical block table 53 shown in FIG. 6. The defective physical block was registered as 'occupied' in the physical block table 52. Some of those registered defective physical blocks may include a page (a representative page ar to be described later) of which physical address includes the specific number of bits, '00000'. The logical block C formed on such defective physical block B is preferable to be registered as 'valid' in the logical block table 53 by the logical block table preparation means 531.

That is, the logical block table preparation means 531 may functions as a valid state setting means 532 so that the logical block C formed on the defective physical block is set to 'valid' in the logical block table 53.

If the logical block C was registered as 'invalid', the physical block B corresponding to the logical block C would be considered as a data to be erased at the erasing: the erasing will be described later. In fact, the defective physical block storing no data, if it is registered as 'valid', will not be handled as the physical block to be erased.

Therefore, all the logical blocks C formed on the defective physical blocks are registered as 'valid' in the logical block table 53, so that the defective physical blocks can be excluded from the physical blocks to be erased. In result, it is possible to avoid unnecessary erasing processing.

In addition to the physical block table 52 and the logical block table 53, a first table 51 is also prepared on RAM in the address control means 5.

Figure 7:
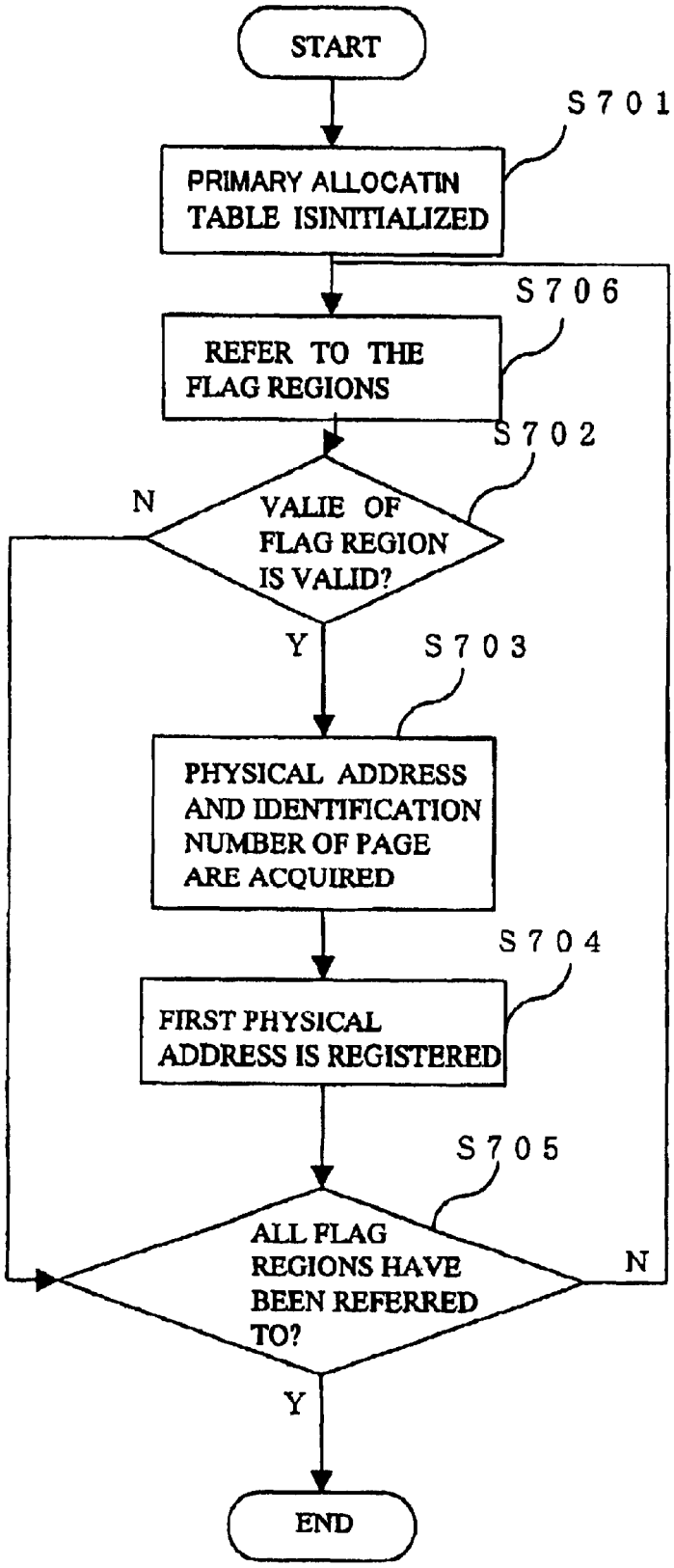
FIG. 7 is a flowchart showing a concrete example of a procedure for preparing a first table.

For instance, after the preparation of the physical block table 52 and the logical block table 53 in accordance with the above-mentioned steps, a first table preparation means 511 provided to the preparation means 510 starts to prepare the first table 51. FIG. 7 is a flowchart showing an example of steps of preparing the first table 51.

First, the first table preparation means 511 initializes the first table 51 (S701 in FIG. 7). And then, the first table preparation means 511 looks in the flag section 90 in the page A of which physical address includes the specific number of bits '01000' (S706 in FIG. 7). Besides, the first table preparation means 511 may look in only the flag sections 90 contained in the physical blocks B registered as 'occupied' in physical block table 52.

By confirming the flag section 90, the first table preparation means 511 judges whether the value of the flag section 90 is valid or invalid (S702 in FIG. 7). If it is determined that the value of the flag section 90 is valid, the first table preparation means 511 obtains the physical address of Page A containing the flag section 90 and an ID number retained in the second table 80 stored in Page A; the ID number including upper 13 bits of the logical address, in this embodiment (S703 in FIG. 7). The ID number is an identifier for specifying a field 50 in the first table 51 shown in FIG. 8. In this embodiment, the ID number is considered to include the upper 13 bits in the logical address.

Figure 8:
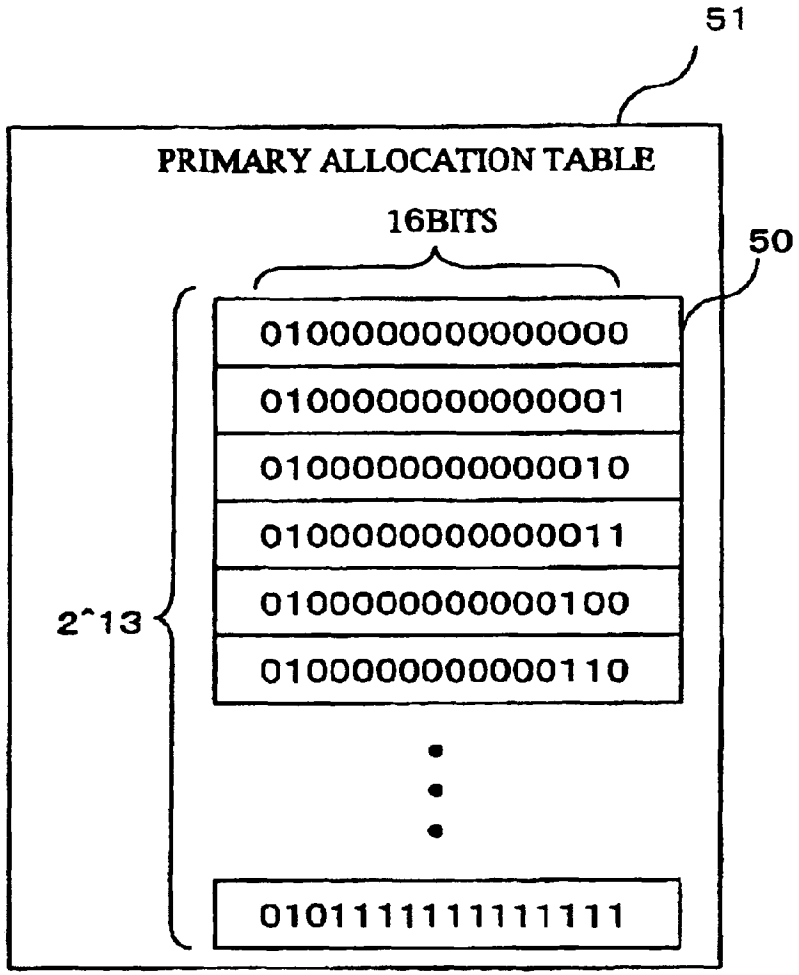
FIG. 8 is an illustration showing a first table.

As shown in FIG. 8, in the field 50 indicated by the obtained ID number, the first table preparation means 511 registers specific 16 bits of the physical address as a first physical address; the specific 16 bits is included in the physical address indicating the page A storing the second table (S704 in FIG. 7). The specific 16 bits does not include the specific 5 bits, '01000', that is shared with each physical address of pages A capable of storing the second table. The registration of the specific 16 bits is based on the following reason. The nonvolatile memory 2 in the embodiment contains 2^21 Pages A (1 gigabyte/512 bytes), and the physical address of Page A is represented by 21 bits. The Page A capable of storing the second table has the physical address including the specific 5 bits, '01000'. Accordingly, if the specific 16 bits of the physical address can be specified, a specific second table can be specified from all of the second tables 80 stored in the nonvolatile memory.

The table A capable of storing the second table 80 has been determined in advance, whereby the storage capacity of the first table can be reduced. Besides, as a matter of course, the memory such as ROM in the memory device 1 should store information that the Page A of the physical address including the specific 5 bits, '01000', is storing the second table 80. The embodiment is grounded on that the page A of the physical address including the specific 5 bits, '01000', stores the second table 80. However, it may be designed so that Pages A other than those of the physical address including the specific 5 bits, '01000', may store the second table 80.

After registering the first physical address, the first table preparation means 511 judges whether or not all of the flag sections 90 have been looked in (S705 in FIG. 7). If it is determined that all of the flag sections 90 has not been looked in, the first table preparation means 511 looked in another flag section 90 that has not been looked in (S706 in FIG. 7). And these steps are executed repeatedly until it is determined that all of the flag sections 90 have been looked in.

Besides, in the embodiment, the second table 80 corresponding to the flag section 90 is stored in the nonvolatile memory 2, and the number of those second tables 80 is 2^13. Accordingly, the number of fields 50 becomes 2^13. In result, the size of the first table 51 becomes 16 bits×2^13=16 kilobytes. The second table corresponds to the flag section 90, and the number of the second tables is 2^13, of which grounds will be described later.

On the other hand, if it is determined that the value of the flag section 90 is invalid, the first table preparation means 511 does not register the physical address and the ID number in the first table 51 as mentioned above, but the step goes to S706.

The physical block table 52, the logical block table 53 and the first table 51 are prepared in a way as mentioned above, but the order of preparing the tables is not limited to the aforementioned order. Those 3 tables may be prepared simultaneously, for example.

In the above description, the physical block table 52, the logical block table 53 and the first table 51 are prepared separately by respective table preparing means. But those preparation means may cooperate to prepare the physical block table 52, the logical block table 53 and the first table 51, according to following steps.

At preparing the physical block table 52, the physical block table preparation means 521 judges whether or not the physical block B stores data. At this time, the second table 80 may be detected in the physical block B. The moment that the physical block table preparation means 521 detects the second table 80 in such way, the logical block table preparation means 531 and the first table preparation means 511 judge whether the value of the flag section 90 corresponding to the second table 80 is valid or invalid. If the value of the section 90 is valid, the logical block table preparation means 531 registers the logical block C as 'valid' in the logical block table 53; the logical block C specified by the second physical address Ca that the second table 80 indicates. Meanwhile, the first table preparation means 511 registers the specific 16 bits in the field 50; the specific 16 bits included in the physical address of Page A; and the field 50 indicated by the ID number stored in the second table 80.

Figure 9B:
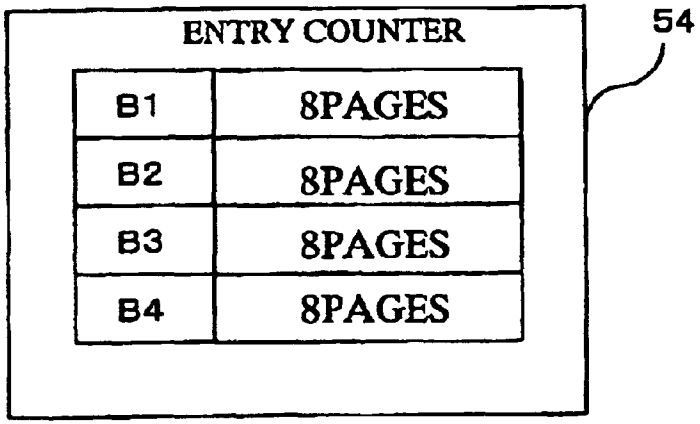
FIGS. 9A and 9B are illustrations for an address register and an entry counter, respectively.
Figure 9A:
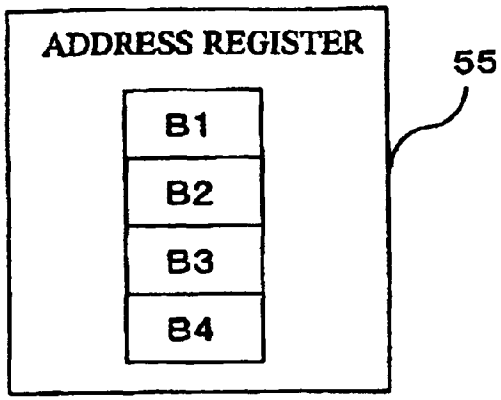

Additionally, at the time of power on, an address register preparation means 551 in the preparation means 510 may prepare on RAM of the address control 5 an address register 55 shown in FIG. 9A and an entry counter 54 shown in FIG. 9B according to following steps.

First, the address register preparation means 551 initializes the address register 55. The address register preparation means 551 look in the physical block table 52, and registers in the address register 55 the specific number of physical addresses of blank physical blocks.

Regarding each physical block B registered in the address register 55, the address register preparation means 551 registers the number of pages storing data (i.e. the number of pages is '8' in this embodiment) in the entry counter 54 provided to RAM, as shown in FIG. 9B.

Besides, the update of the address register 55 and the registration of the number of pages into the entry counter 54 may not be executed at the time of power-on, but may be executed at the writing of data into the nonvolatile memory 2, for example. The under mentioned explanation relates to a case where the number of pages storing data was registered in the entry counter 54. Besides, the address register preparation means 551 may register the number of pages storing no data or the number of logical blocks C formed on the physical blocks into the entry counter 54.

[Writing]

The physical block table 52, logical block table 53, and the first table 51 are prepared; in result the memory device 1 allows a data input-output device 7 to write data. In the embodiment, it is assumed that the logical block C formed on the nonvolatile memory 2 is 16 kilobytes. Accordingly, the number of logical blocks C formed on the nonvolatile memory 2 is found by 1 gigabytes/16 kilobytes =2^16, and the logical block C can be represented by information of 16 bits. A write request sent from the data input-output device 7 to the memory device 1 includes data of 16 kilobytes and a logical address S of 16 bits.

The write request from the data input-output device 7 is received by an input-output control means 4 provided to the memory device 1.

Upon receipt of the data and the logical address C, the input-output control means 4 divides the received data by a page capacity (512 bytes), and forms 32 data blocks. And the 32 data blocks are transmitted to respective buffers 31–34 in a unit operable to of 8 data blocks simultaneously. On the other hand, the logical address S included in the received write request is transmitted to the writing means 100 provided to the memory device 1.

Upon receipt of the logical address S, the writing means 100 selects the physical blocks B to form the logical blocks C1 containing the data to be written. Besides, in the embodiment, the writing means 100 forms the logical blocks C1 over four physical blocks because the buffers 31 to 34 are connected to the nonvolatile memory 2 through buses 1 to 4.

Regarding the 4 physical blocks, the writing means 100 registers 4 physical addresses in the address register 55. For instance, when the 4 physical blocks B1 to B4 are registered in the address register 55 as shown in FIG. 9A, the writing means 100 selects those physical blocks B1 to B4 as a write-candidate physical block (S1001 in FIG. 10). After registering the physical addresses of the physical blocks, the writing means 100 registers, in the entry counter 54 as shown in FIG. 9B, the numbers of data-written pages included in respective physical blocks registered in the address register 55. At this time, the writing means 100 functions as an address register preparation means 551.

Besides, when the physical blocks B were registered in the address register 55 in advance, the writing means 100 determines the registered physical blocks B as write-candidate physical blocks.

Figure 10:
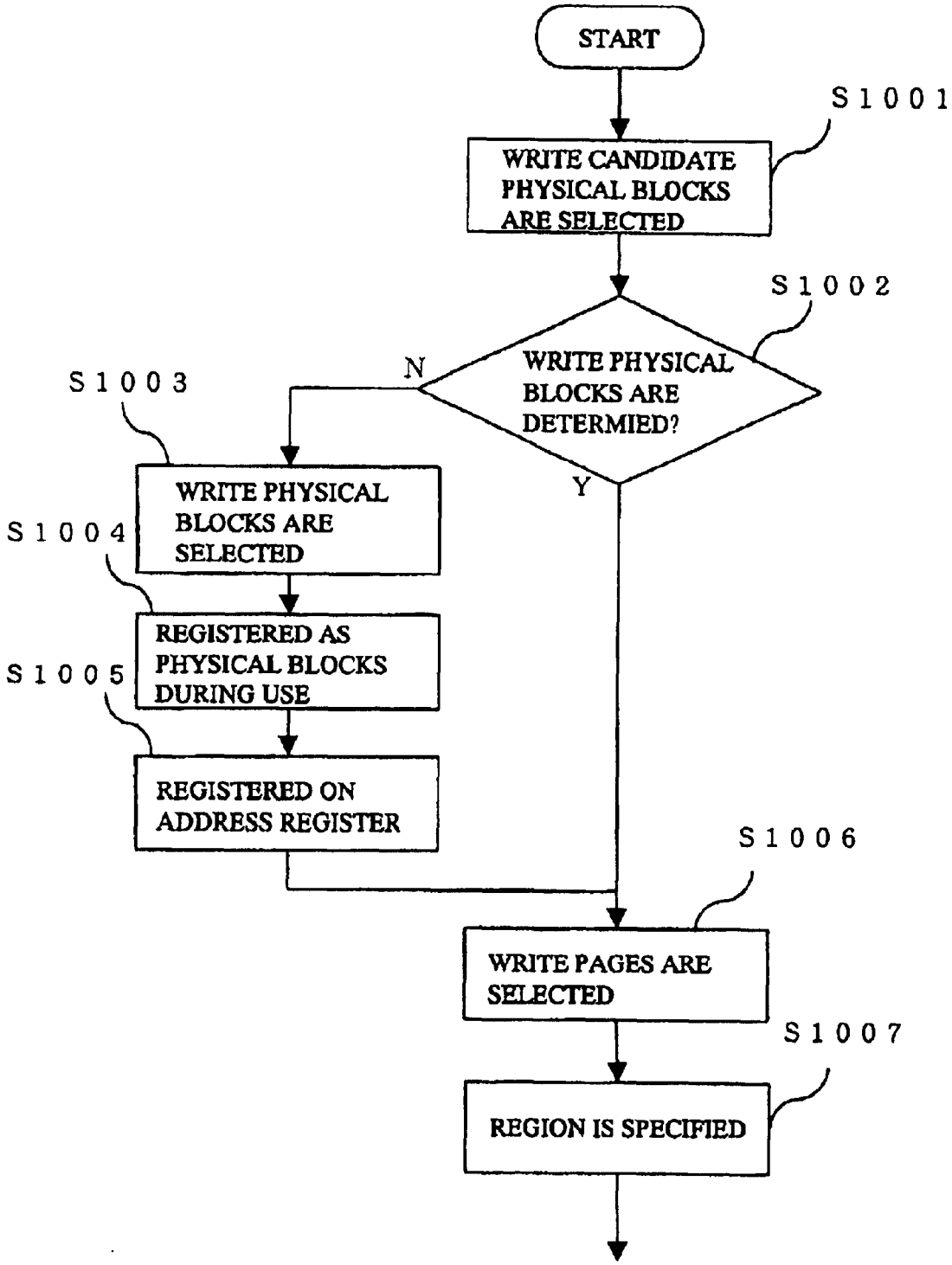
FIG. 10 is a flowchart showing a procedure of writing data in a nonvolatile memory.

Next, the writing means 100 looks in the entry counter 54, and determines whether or not the write-candidate physical blocks change to write-target physical blocks (S1002 in FIG. 10). In this embodiment, 32 data blocks to be written are stored in 4 physical blocks B, with the result that one physical block B stores 8 data blocks. Therefore, the writing means 100 looks in respective values in the entry counter 54 corresponding to the 4 write-candidate physical blocks, and confirms whether each value of the entry counter is 24 or less, namely, whether or not there are 8 and more blank pages.

FIG. 9B shows the entry counter 54 of which values correspond to the physical blocks B1 to B4, and all the values are 8. Accordingly, the writing means 100 determines all the write-candidate physical blocks B1 to B4 as the write-target physical blocks B1 to B4.

If 25 and more is recorded as a value in the entry counter 54, (namely, when there are not 8 and more blank pages), the writing means 100 determines that the corresponding write-candidate physical block is 'write-disenable'. Subsequently, the writing means 100 refers to the physical block table 52, and then selects the blank physical blocks B as many as the write-disenable physical blocks. The selected blank physical block is determined as the write-target physical block by the writing means 100, and they are registers as 'occupied' in the physical block table 52 (S1003 to S1004 in FIG. 10). Regarding the physical block registered in the physical block table 52 as 'occupied', the writing means 100 registers the physical address in the address register 55 (S1005, in FIG. 10).

When the address register 55 retains the physical addresses of the physical blocks B corresponding to the values in the entry counter 54 indicating 25 and more, the address register 55 seems not to be updated for a period between the previous writing and the current writing. That is to say, if the address register is not updated, the address register will keep the physical addresses of the physical blocks B wherein all the pages A stored data at the previous writing.

After determining the 4 write-target physical blocks as described above, the writing means 100 refers to the entry counter 54, and selects 8 by 8 pages from respective write-target physical blocks forming the logical blocks C1; the pages to which data blocks are written (S1006 in FIG. 10). In this embodiment, the writing means 100 writes data into Page A in order in which the physical address of Page A is small. Therefore, when the values in the entry counter 54 indicate 8 as shown in FIG. 9B, the respective write-target physical blocks B1 to B4 corresponding to the entry counter 54 contain plural pages A, and data is written from Page A having the smallest physical address to the 8th smallest Page A (those pages are surrounded by a dot-and-dashed line L in FIG. 12).

Therefore, the wringing means 100 selects as a write-target page the other pages A indicated by the 9th smallest physical address to the 16th smallest physical address within the same physical blocks B1 to B4, and the physical addresses for the determined write-target pages are stored.

Then, the writing means 100 specifies one field 50 in the first table 51 by means of the specific bits S1 included in the logical address S (S1 corresponds to upper 13 bits because the number of the fields 50 are 2^13 in the embodiment) attached to the data sent from the data input-output device 7 (S1007 in FIG. 10). Besides, the specific 13 bits may be lower 13 bits in the logical address, and by using the lower 13 bits one field 50 may be specified.

That is, the specified field 50 is to store the specific 16 bits of the physical address indicating Page A storing the second table 80. The writing means 100 reads the specific 16 bits in the specified field 50, and then prepares the physical address of the page A storing the second table 80 by adding '01000' to the read physical address.

Figure 11:
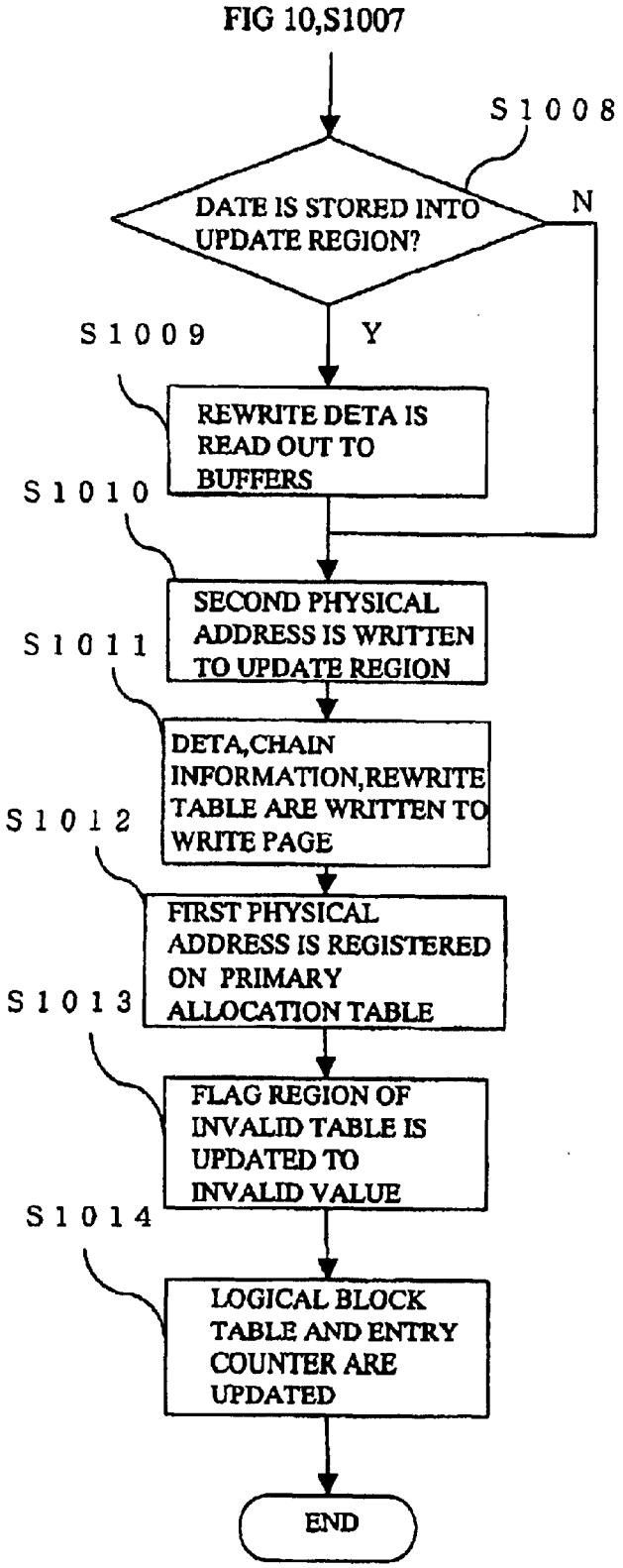
FIG. 11 is a flowchart showing a procedure of writing data in a nonvolatile memory.

The writing means 100 judges whether or not Page A indicated by the prepared physical address has stored the second physical address, for example (S1008 in FIG. 11).

If it is determined that Page A has stored any data, the writing means 100 reads the second table 80 stored in the Page A as a rewrite table onto the buffers 31 to 34. And then, the writing means 100 recognizes the original second table 80 in Page A as an invalid table (S1009 in FIG. 11). At this time, the writing means 100 reads the rewritable table onto blank areas in buffers 31 to 34 so as not to overwrite the other data previously stored in the buffers 31 to 34 by the rewritable table.

Then, the writing means 100 specifies an update field 81 in the read rewrite table by using the other specific bits S2 in the logical address S; the other specific bits S2 corresponds to lower 3 bits in the logical address in the embodiment. And then the writing means judges whether or not the update field 81 stores the second physical address Ca. Besides, in this embodiment, the rewrite table (the second table 80) is provided with 8 update fields 81. The ground that the rewritable table should be configured by 8 update fields 81 will be described later.

Only if the second physical address Ca has been written into the update field 81, the writing means 100 registers the logical block C in the logical block table 53 as 'invalid'; the logical block C is specified by the second physical address Ca.

As described above, the writing means 100 updates the specified update field 81 with a new second physical address Ca that is the specific 16 bits of the physical address indicating the representative page of the write-target pages (S1010 in FIG. 11). In the embodiment, the specific 5 bits of the physical address of every representative page ar is '00000', thereby only the specific 16 bits may be registered in the update field 81. Besides, the information, indicating that the representative page ar indicates Page A of which physical address includes the specific 5 bits '00000', may be recorded by the writing means 100 in advance, or the information may be recorded in a memory such as ROM in the memory device 1.

It is configured as above so that the update field 81 is updated after reading the rewrite table onto the buffers 31 to 34, because it is not possible to overwrite data in the non-volatile memory 2.

After the update field 81 is updated by the second physical address Ca as above, the writing means 100 executes following steps: the data block on the buffers 31 to 34 is written into the data area Aa in the write-target page through buses D1 to D4, and the updated rewrite table is written into one or plural management areas Ab of the write-target pages, and then chain information is written into one or plural management areas Ab in the write-target pages (S1011 in FIG. 11). The method of writing the chain information is described hereinafter. The 'chain information' is information for a reading means 60 to read data stored in the representative page ar in the physical block C and to obtain the other physical address of the write-target page in the logical block.

Figure 12:
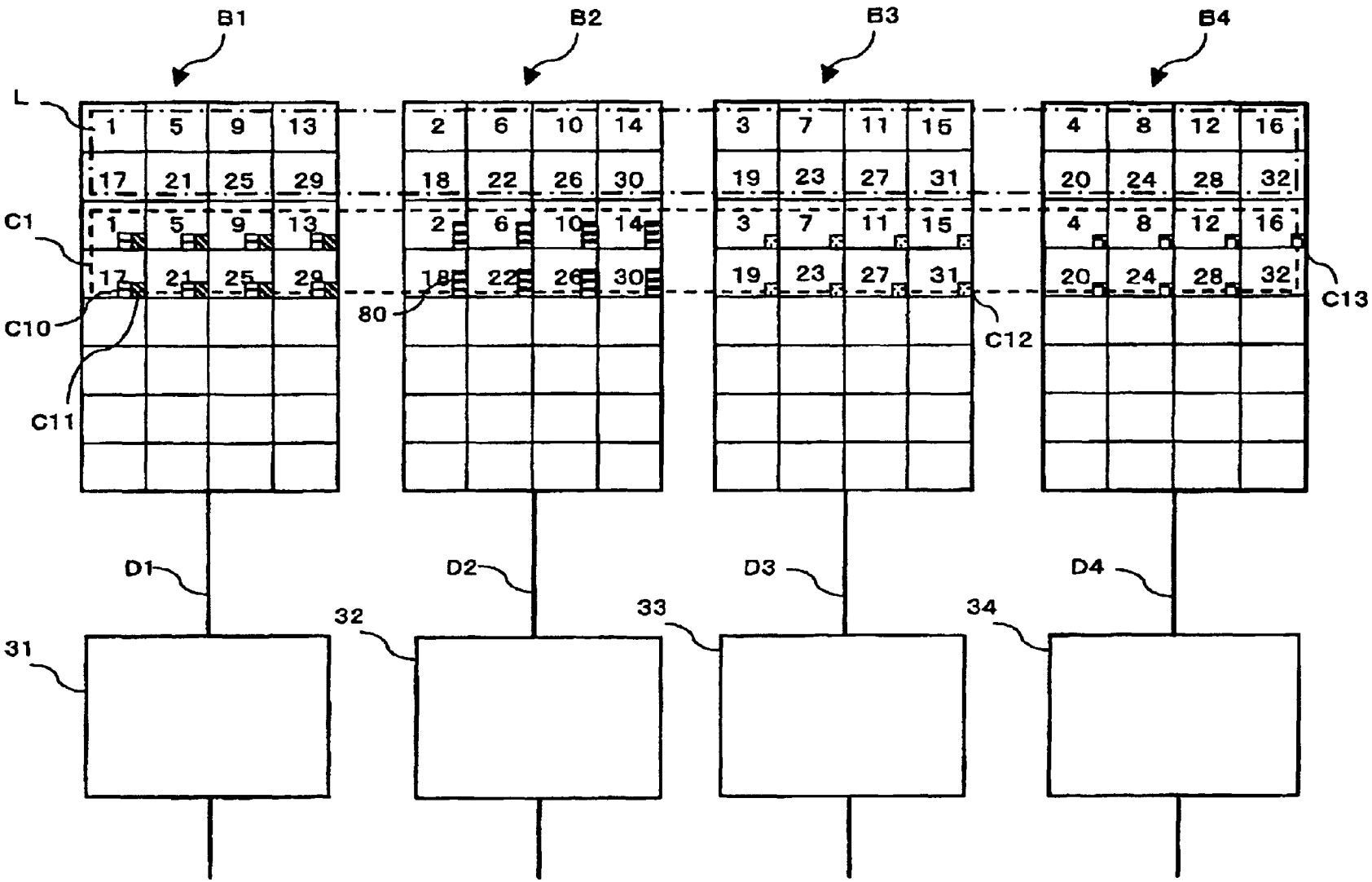
FIG. 12 is an illustration showing a concrete example of a flash memory in which chain information has been written.

FIG. 12 shows a logical block C1, for example. Where the representative page ar in the logical block C1 is Page 1, Page 1 stores in the management area Ab the physical address of Page 2 in the logical block C1 as the chain information. Likewise, if Page N stores in the management area Ab the chain information representing the physical address of Page N+1, the reading means 60 traces the chain information, and obtains the physical addresses of all Pages 2 to 32 contained in the logical block C1 shown in FIG. 12.

It is natural that in this case, the reading means 60 must read all the chain information stored in Pages 1 to 19 in order to obtain the physical address of Page 20. Therefore, such steps increase the time for the reading means 60 to access Page 20.

In order to reduce the access time, it may be configured so that the representative page ar (Page 1) may store in the management area Ab the physical addresses of Pages 2 to 32 as the chain information, for example. Under such configuration, the reading means 60 reads the chain information stored in the management area Ab on Page 1, thereby obtaining the physical addresses of Pages 2 to 32. In result, it is possible to reduce the time for accessing respective pages.

In this embodiment, the logical block C1 is formed over 4 physical blocks, B1 to B4. All the physical addresses of Pages A contained in the logical block C1 can be easily obtained according to the physical addresses of top pages (Pages 1 to 4) in the respective physical blocks B1 to B4, for example. The physical address of Page 20 can be found only by adding 4 to the physical address of Page 4. Accordingly, instead of storing the physical addresses of Pages 2 to 32 as the chain information, the management area Ab on Page 1 (the representative page ar) may store the physical addresses of Pages 2 to 4 as the chain information.

Moreover, the management area Ab may store management information such as the second table 80 and the error correction information in addition to the chain information. However, it is not possible to secure so large area for the management area Ab. In this case, if the chain information is written first into the management area Ab, the second table and the others cannot be added in the management area Ab.

For example, the logical block C1 contains Pages 1 to 32 as shown in FIG. 12. On Pages 2, 6, 10, 14, 18, 22, 26 and 30 of those pages, the management areas Ab can store the second tables 80.

Providing that, as described above, the management area Ab on Page N stores the chain information indicating the physical address of Page N+1, the chain information must be written also into each management areas Ab on Pages 2, 6, 10, 14, 18, 22, 26 and 30 in which the second table 80 is stored respectively. The chain information is stored in the management areas Ab in respective Pages 2, 6, 10, 14, 18, 22, 26 and 30, whereby the management area Ab may not secure the capacity for storing the second table 80. Therefore, the writing means 100 writes the chain information onto other pages A except the pages wherein each management area Ab stores the second table 80.

Specifically, chain information Cll indicating the physical address of Page 4k+3, (k=0, 1, 2, Λ, 7), is written into the management area Ab on Page 4k+1, instead of Page 4k+2 storing the second table 80. Therefore, the management area Ab on Page 4k+1 stores both chain information C10 indicating the physical address of Page 4k+2 and chain information C11 indicating the physical address of Page 4k+3, as shown in FIG. 12. Moreover, chain information C12 indicating the physical address of Page 4k+4 is written into the management area Ab on Page 4k+3, and chain information C13 indicating the physical address of Page 4k+1 is written into the management area Ab on Page 4k+4.

Accordingly, the chain information can be stored into the management areas Ab except for the management area Ab storing the second table 80.

Moreover, if Page N stores in the management area Ab the chain information indicating the physical address of Page N+1, the reading means 60 can obtain the chain information indicating the physical address of Page N+1 by referring to the management area Ab on Page N. On the other hand, in a case where the chain information is written in a way as described above, even if the reading means 60 refers to the management area Ab on Page 4k+2 storing the second table 80, the reading means 60 cannot obtain the chain information indicating the physical address of the next Page 4k+3. Therefore, at reading Page 4k+1, the reading means 60 reads all the chain information, that is, not only the chain information C10 but also the chain information C11 in this case, and then retains the readout chain information. Then, after reading Page 4k+2, the reading means 60 may obtain the physical address of Page 4k+3 by means of the retained chain information C11.

In the above example, the chain information both C10 and C11 is written into the management area Ab on Page 4k+1 as shown in FIG. 12. But the management area Ab on Page 4k+1 may store the chain information C12 and C13.

Some of the management information is indispensable like the error correction information. Accordingly, the management area Ab on Page 4k+1 does not have an enough space to write all the chain information C10 to C13 therein, or the management area AB is not an appropriate space to write such information therein. Therefore, the number of chain information to be written into one management area Ab should be determined in advance. The writing means 100 may work so as to write the specific number of chain information into one management area Ab and then write the rest chain information into the other management areas Ab on the other pages A. The specific number here may be determined on the basis of the specification, such as the number of pages contained in one logical block.

After the writing of the data, the rewrite table, and the chain information, the writing means 100 writes the specific 16 bits into the specific field 50 as the first physical address; the specific 16 bits is included in the physical address of the write-target page storing the rewrite table, and the field 50 is specified by ID number described in the rewrite table (S1012 in FIG. 11). Then, the writing means 100 determined the second table 80 recognized as the invalid table in the aforementioned step(S1009), and regarding Page A storing the invalid second table 80, the writing means 100 updates the flag section 90 therein to an 'invalid' value (S1013 in FIG. 11).

The nonvolatile memory has a feature that data is written in pages, as described before. But, the memory device 1 of the present invention is configured so that the flag section 90 can be updated independently separating from the other areas within the same page. For instance, where the initialized flag section 90 indicates '00' after the erasing, '00' is considered as 'valid' while 'FF' as 'invalid'. In this case, the writing means 100 can update the flag section 90 from '00' to 'FF', separating from the other areas within the same page. And where the flag section 90 indicates 'FF' after the erasing, 'FF' is considered as 'valid' while '00' as 'invalid'. Likewise, only the flag section 90 is updated from 'FF' to '00'. The update of the flag section 90 to the 'invalid' value may be executed at the same time that the rewrite table is read out onto the buffers 31 to 34.

A reason that the flag section in the page storing the invalid table is updated to the invalid value is as follows. When the power of the memory device 1 is applied again due to a shut-off of electric power, the logical block table preparation means 531 is activated. At this time, the logical block C, which is specified by the second physical address Ca stored in the invalid table, is also registered in the logical block table 53 as 'valid'. In result, the nonvolatile memory has a plurality of the second tables bearing with the same ID number. The first table preparation means 511 cannot determine the first physical address to be stored.

However, after the flag section 90 is updated to the invalid value as mentioned above, when the power of the memory device 1 is applied again due to a shut-off of electric power, the first table preparation means 511 can obtain the physical address of Page A containing the second table 80 with the valid flag section 90. Therefore, the first table preparation means 511 can register as the first physical address on the first table 51 the specific 16 bits included in the physical address of the valid second table 80.

After updating the value of the flag section 90 to the invalid value in S1013, the writing means 100 updates the entry counter 54 and the logical block table 53 (S1014 in FIG. 11).

The update of the entry counter 54 is to add the number of data-written pages to the stored values in the entry counter 54 corresponding to the write-target physical blocks B1 to B4, for example. The update of the logical block table 53 is to register the logical block C in the logical block table 53 as 'valid'; the logical block C containing the representative page ar on which data has been written.

Moreover, when it is determined in step S1008 that no data is stored in Page A including the second table 80, the writing means 100 goes to step S1010 without reading the second table onto the buffers 31 to 34 as the rewrite table.

The address register 55 is updated by the address register preparation means 551, at the time of receiving the write request by the memory device 1 or in a specific cycle, for example. That is to say, the address register preparation means 551 refers to the value in the entry counter 54 corresponding to a specific physical block B, if the value change to 32, the physical address of the specific physical block B is deleted from the address register 55. In addition, when the address register 55 is updated, the value in the entry counter 54 is automatically updated to '0' by the address register preparation means 551.

It was described that, when the power is turned on in the memory device 1, the physical block table preparation means 521 determines whether or not the physical block is defective. The writing means 100 may also determine whether or not the write-target physical block is defective at the time of the writing. In this case, the writing means 100 functions as the defective physical block judgment means 522, the use state setting means 523, and the valid state setting means 532.

[Data Reading]

As described above, the storage capacity of the nonvolatile memory 2 in the memory device 1 of the present invention is 1 gigabyte and that of the logical block C is 16 kilobytes, thereby 2^16 of the logical blocks C are formed on the nonvolatile memory 2. Therefore, 16 bits of information is required to represent one logical block C formed on the nonvolatile memory 2.

Hence, the read request transmitted from the data input-output device 7 includes the logical address S of 16 bits for specifying a read-target logical block C.

The request to read the logical block C1 shown in FIG. 12 is transmitted from the data input-output device 7 to the memory device 1, and the memory device 1 receives the read request by the input-output control means 4. The input-output control means 4 transfers the read request to the reading means 60.

Figure 13:
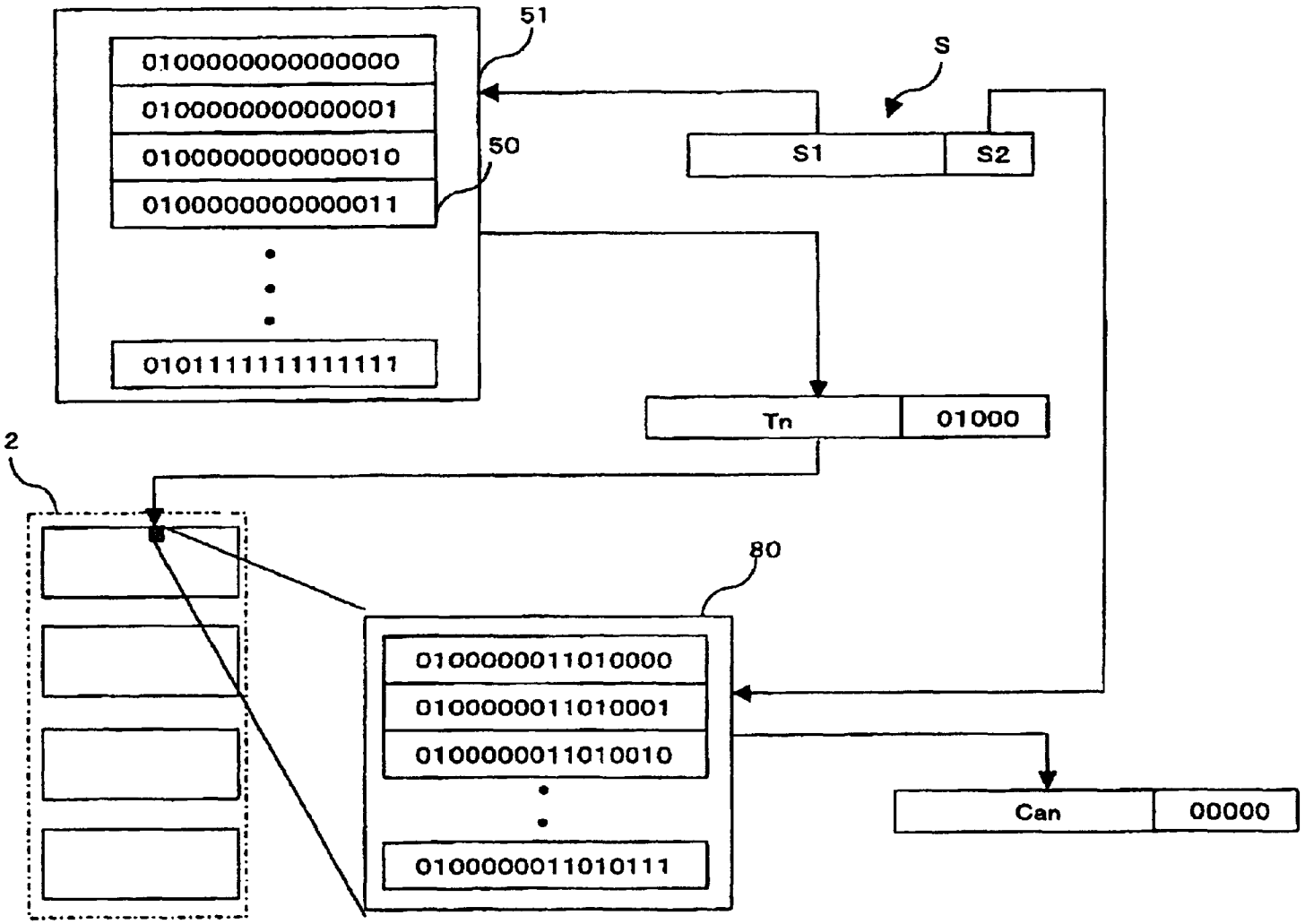
FIG. 13 is a conceptual illustration showing a procedure for obtaining a physical address of a representative page.
Figure 14:
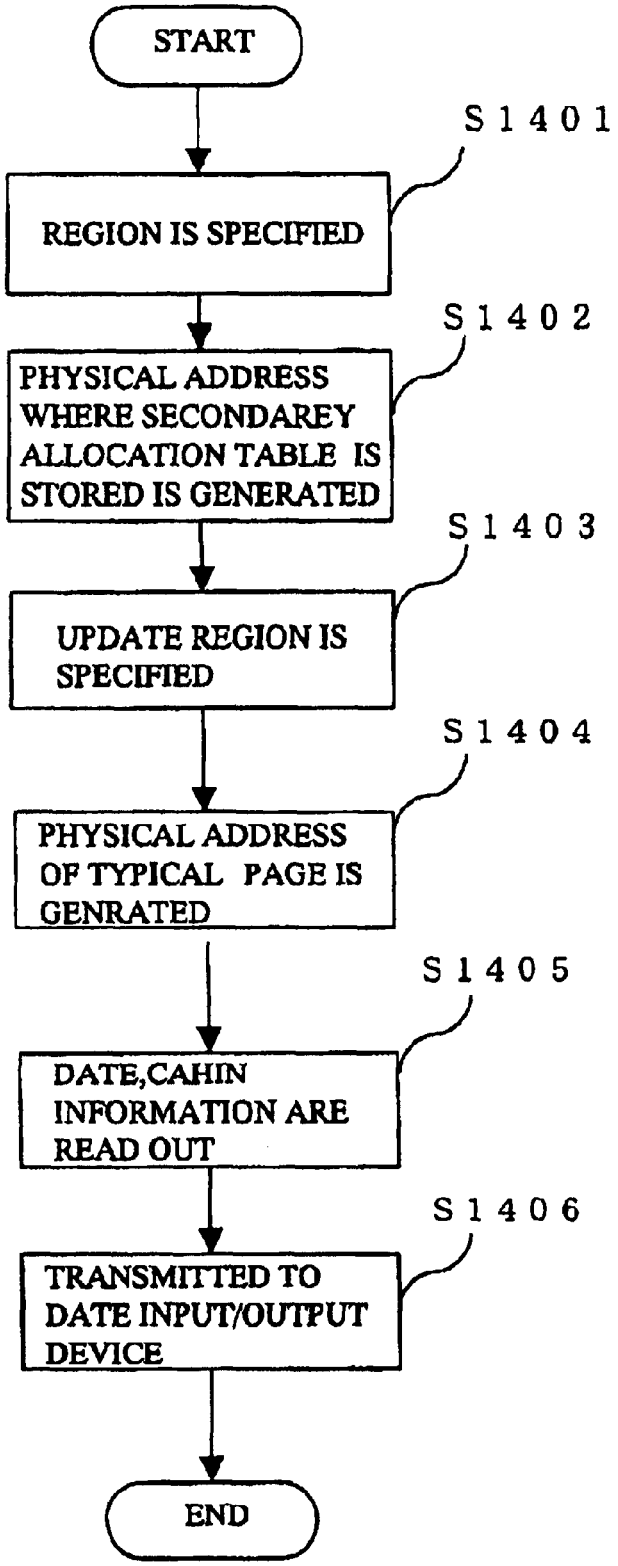
FIG. 14 is a flowchart showing a procedure of reading data.

Upon receipt the read request, the reading means 60 specifies one field 50 in the first table 51 by means of the upper 13 bits S1 of the logical address S included in the read request as shown in FIG. 13 (S1401 in FIG. 14).

The reading means 60 reads a first physical address Tn (n:0 to 2^13-1) registered on the specified field 50, and then generates the physical address Tn+0100 of Page A storing the second table 80 by adding '01000' to the read first physical address (S1402 in Fig, 14).

Then, by means of the lower 3 bits of the logical address, the reading means 60 specifies one of the update fields 81 in the second table 80; the second table is stored in Page A of which physical address is generated as above (S1403 in FIG. 14). The reading means 60 reads a second physical address Can (n:0 to 2^3-1) stored in the specified update field 81, and then generates a physical address Can+00000 of the representative page ar by adding '00000' to the second physical address Can (S1404 in FIG. 14).

Since the physical address of the representative page ar can be specified by using the two tables in such way, it is possible to reduce the capacity of the first table 51 provided to RAM as described below.

In a case where one second table 80 consists of 8 update fields 81 and can store 8 second physical addresses Ca therein, the storage capacity of the first table 51 can be found as follows.

The second table 80 can register 8 second physical addresses Ca corresponding to 8 representative pages ar, and the number of the second tables 80 necessary for specifying 2^16 representative pages ar is calculated as 2^16/2^3=2^13.

Accordingly, the first table 51 for specifying the second table 80 may store 2^13 first physical addresses only, whereby the number of fields 50 is 2^13. In result, the capacity of the first table 51 is 16 bits×2^13=16 kilobytes.

On the other hand, in the conventional method wherein the second physical address Ca is specified only by a table provided to RAM, the table should store 2^16 second physical addresses Ca. Therefore, the capacity of the table is 16 bits×2^=128 kilobytes. In this way, the memory device 1 of the present invention is designed so as to reduce the capacity of RAM as compared with the conventional method.

After generating the physical address of the representative page ar (Page 1 in FIG. 12) of the logical block C1, the reading means 60 reads the data and chain information C10 and C11 stored in the representative page ar onto the buffer 31 through the connected bus D1 (S1405 in FIG. 14).

Then, the reading means 60 refers to the read chain information C10 and C11, and reads the data and chain information stored in Pages A of which physical addresses are indicated by the chain information C10 and C11. Here, since the chain information C10 indicates the physical address of Page 2 and C11 indicates the physical address of Page 3, the reading means 60 reads the data and chain information stored in Pages 2 and 3 onto the buffers 32 and 33 through the buses D2 and D3.

At this time, the reading means 60 can use the buses D2 and D3 to read the data and chain information stored in pages 2 and 3, thereby the reading can be operated quickly. And in a case where the management area Ab on Page 4k+1 stores the chain information C10, C11 and C12, the reading means 60 can read the data and chain information stored in Pages 4k+1, 4k+2, 4k+3, and 4k+4 simultaneously onto the buffers 31 to 34 by means of 4 buses D1 to D4.

As described above, the reading means 60 reads the data and chain information stored in Page A having the physical address indicated by the chain information, and then performs the reading up to the last page in the logical block.

The data read onto the buffers 31 to 34 is transmitted to the input-output device 7 by the reading means 60 through the input-output control means 4 (S1406 in FIG. 14).

The chain information as set above can be also used to read data in response to a cue request. The cue request is one of the read requests, and instructs to read the data in pages starting from Page 20 in logical block C1, for example. The cue request contains the logical address S and the 5 bits logical address (a cue address), and the 5 bits logical address represents a logical address of a top page of data corresponding to the cue request.

When the cue request is transmitted to the memory device 1 from the data input-output device 7, the input-output control means 4 receives the cue request and then transfers the logical address S and the cue address to the reading means 60.

Upon receipt of the logical address S and the cue address, the reading means 60 determines a page of data indicated by the cue address.

Then, the reading means 60 specifies the physical address of the representative page ar as described above by using the logical address S therein. And according to the chain information stored in the representative page ar, the reading means 60 reads data written in pages starting from the page indicated by the cue address (those pages starting from Page 20). In such a way, the chain information can be used when the reading means 60 accesses data specified by the cue address.

The second table 80 may also be formed over plural pages A. For example, the second table 80 may be formed over 4 pages of which physical addresses are consecutive. In such case, a specific one page of the 4 pages may store the flag section 90 indicating whether the second table is 'valid' or 'invalid'.

[Erasing]

When the writing is performed in the specific cycle as described above, the nonvolatile memory 2 comes to contain a number of physical blocks storing the valid and invalid data. As mentioned before, the nonvolatile memory has a feature that data is erased in physical blocks B. If the erasing is performed on the physical block storing both the valid and invalid data, the valid data is also erased inadvertently.

In spite of the above feature of the nonvolatile memory, the present invention provides a method capable of efficiently erasing only the invalid data without erasing the valid data, and provides a method of increasing the free space of the nonvolatile memory. The erasing should be performed as follows.

Figure 15:
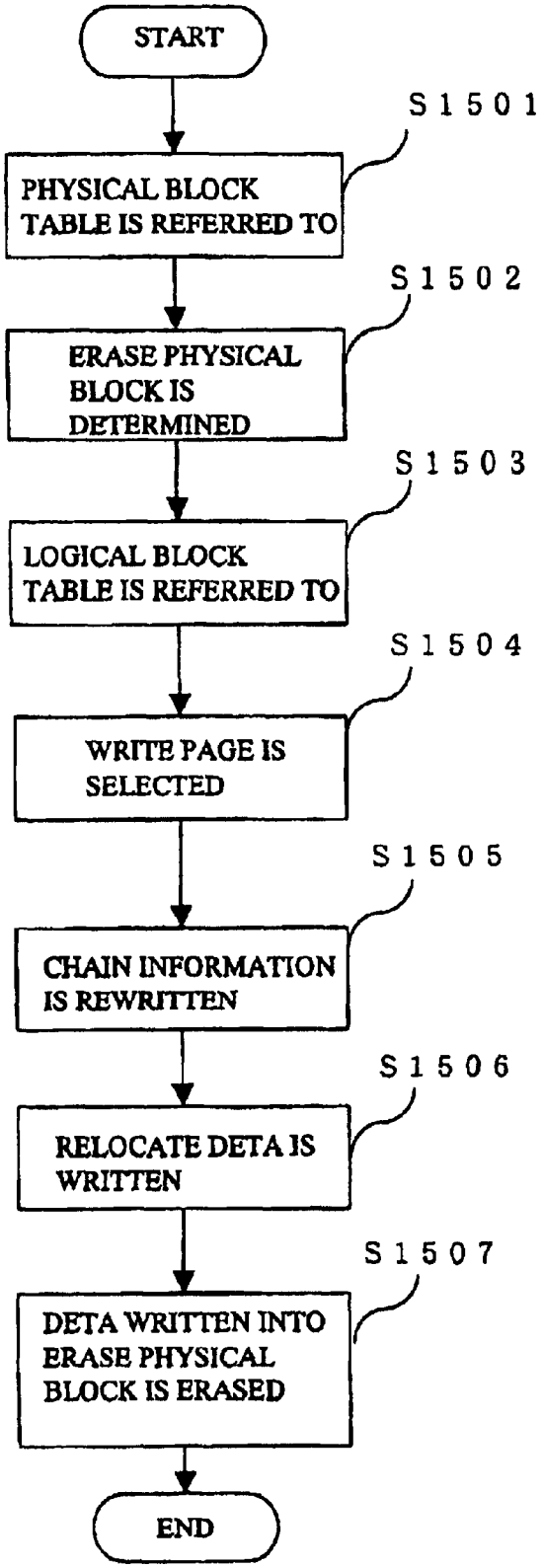
FIG. 15 is a flowchart showing a procedure of erasing data.

An erasing means 70 first refers to the physical block table 52, and obtains the physical blocks registered as 'occupied' in the physical block table 52 (Si501 in FIG. 15), and confirms the states of the logical blocks formed on the obtained physical blocks, referring to the logical block table 53 (S1501 in FIG. 15).

The erasing means 70 decides the erase-candidate physical blocks out of the physical blocks registered as 'occupied' in the physical block table 52, the physical blocks including only 2 or less valid logical blocks (S1502 in FIG. 15).

The erasing means 70 confirms the physical blocks B on which the valid logical blocks C are formed. For the confirmation, the chain information stored in the representative page ar corresponding to the logical block C is used (S1503 in FIG. 15).

Subsequent to this, the erasing means 70 reads all of the valid logical blocks C formed on the erase-candidate physical blocks onto the buffers 31 to 34 as save data, even if part of the valid logical blocks C is formed on the erase-candidate physical blocks. Note that the save data also includes the second table 80; the second table 80 stores the second physical address specifying the physical address of the representative page ar in the valid logical block C included in the save data.

After reading the save data, the erasing means 70 notifies the writing means 100 that the save data was read onto the buffers 31 to 34.

The writing means 100 here selects a write-target page to write the save data therein (S1504 in FIG. 15), in the same way of selecting the write-target page to write data transmitted from the data input-output device 7. After selecting the write-target page, the writing means 100 rewrites the chain information stored in the save data on the basis of the physical address of the write-target page (S1505 in FIG. 15). For example, all the physical addresses of write-target pages may be written in advance into the management area Ab in the representative page in the logical block C read out to the buffers 31 to 34. After rewriting the chain information in such way, the writing means 100 writes the read-save data into the write-target pages (S1506 in FIG. 15). Moreover, the second table 80 included in the save data is written into Page A having the physical address including the specific 5 bits ('01000'); Page A is one of the pages to write the save data therein. And then the field 50 specified by the ID number in the second table 80 is updated to the specific 16 bits in the physical address of the page A into which the second table 80 has been written.

After writing the save data, the writing means 100 updates the entry counter 54 and the logical block table 53, in the same way at receiving the write request transmitted from the data input-output device 7. After updating the entry counter 54 and the logical block table 53, the writing means 100 notifies the erasing means 70 that the writing of the save data has completed.

Upon receipt of the notification, the erasing means 70 not only erases data stored in the erase-candidate physical block, but also registers the erase-candidate physical block on the physical block table 52 as a blank physical block (S1507 in FIG. 15).

The above describes the requirements for determining the physical block as an erase-candidate physical block, that is, (1) the physical block has been registered as an 'occupied' physical block on the physical block table 52, and (2) on the physical blocks only 2 or less valid logical block are formed. Moreover, another requirement that the physical address of the physical block has not been registered in the address register 55 may be added to the above requirements. The requirements are not limited to the case as described above, but the requirements may be that only one or no valid logical block is formed on the physical blocks. By selecting a physical blocks B storing much of invalid data as the erase-target physical blocks, the erasing means 70 has only to relocate a small volume of data onto the buffers 31 to 34.

Note that an erase timing of invalid data is not limited in any way, but, for example, the erasing may be automatically performed by the erasing means 70 with specific cycles.

Note that in the description of operations in power-on, the physical block table preparation means 521 determines whether or not a physical block is defective. The erasing means 70 may also determine whether or not an erase-target physical block is a defective block at the erasing. In this case, the erasing means 70 functions as the defective physical block judgment means 522, the use state setting means 523 and the valid state setting means 532.

(Second Embodiment)

In the above description, the writing means 100 determines the second table 80 as the invalid table, and the value of the flag section 90 in Page A storing the invalid second table 80 is updated to an invalid value by the writing means 100. In order to perform the writing as fast as possible, however, such updating operation should be eliminated.

The achieve the above object, the writing means 100 determines Page A into which the rewrite table read onto the buffers 31 to 34 is written, in a manner as described below, and then copies the second table 80 to the determined Page A.

First of all, regarding pages A within the same physical block B that the invalid table is stored, the writing means 100 determines whether or not there are available pages A having the physical address that is larger than the page A storing the invalid table, and includes the specific 5 bits—'01000'. In this embodiment, the second table 80 can be stored only in Page A of which physical address includes the specific 5 bits—'01000'. Accordingly, the writing means 100 must select Page A that has the physical address including the specific 5 bits—'01000'. If there are pages A satisfying the above conditions, the writing means 100 determines the page A having the smallest physical address of those candidate pages as a write-target page A to store the rewrite table. When the writing means 100 stores the rewrite table into thus determined page A, it is configured so that the writing means does not update the value of the flag section 90 stored in the invalid table to a value indicating 'invalid'.

In a case where no page A satisfing the conditions is available, the writing means 100 determines a write-target page as follows. Regarding available pages A that belongs to a specific physical block B other than the physical blocks B storing the invalid table, and whose physical address includes the specific 5 bits—'01000', the writing means 100 determines the page A having the smallest physical address of those pages A as a write-target page for rewrite data. When the rewrite table is stored into thus determined page A, the writing means 100 updates the value of the flag section 90 in the invalid table to an invalid value in a manner similar to the first embodiment.

When the writing means 100 determines Page A into which the rewrite table is written, the logical block table preparation means 531 and the first table preparation means 511 prepares the logical block table 53 and the fist table 51 in a manner as described below.

Figure 16:
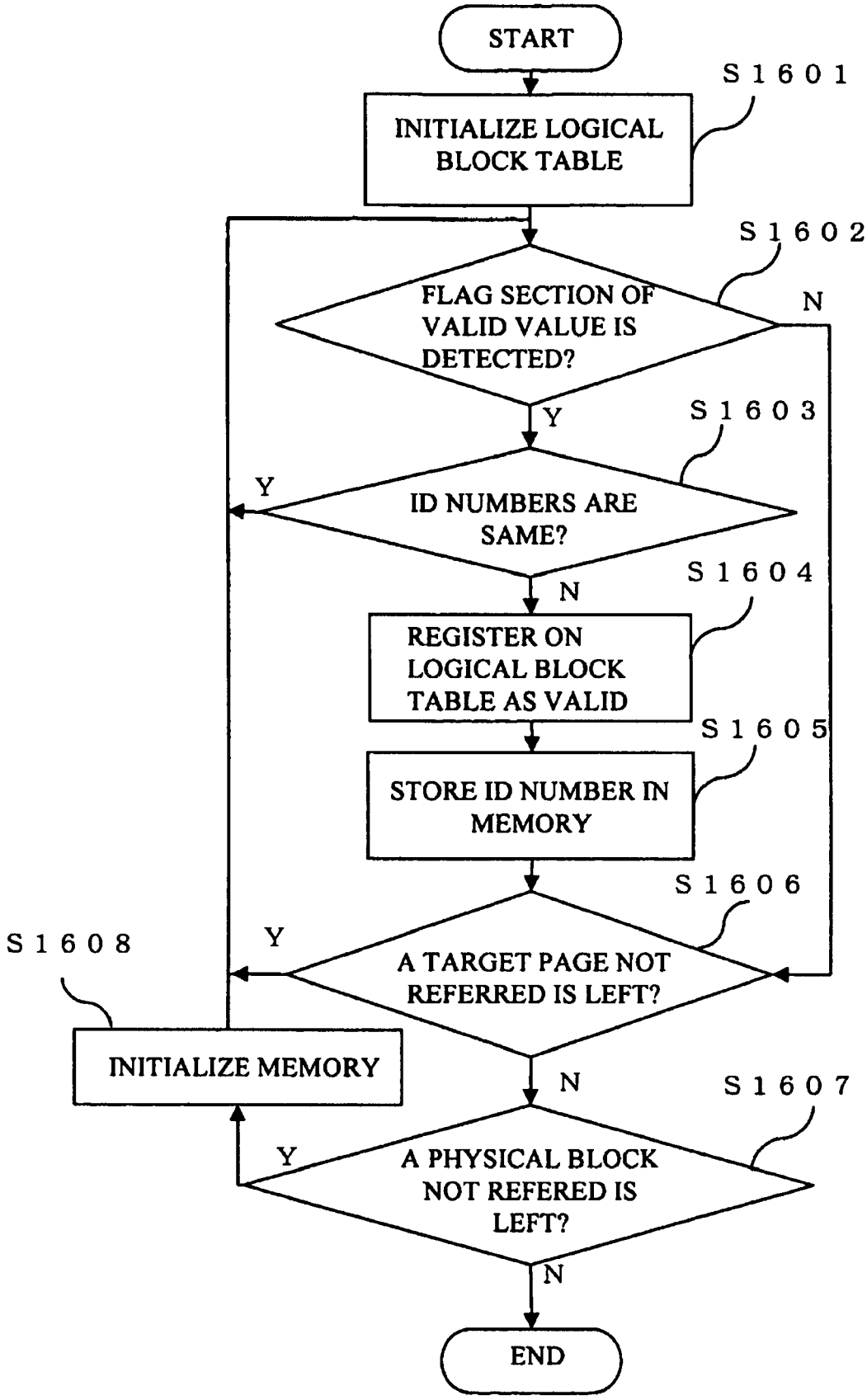
FIG. 16 is a flowchart showing a concrete example of a procedure for preparing a logical block table.

When power is turned on in the memory device 1, the logical block table preparation means 531 at first initializes the logical block table 53 (S1601 in FIG. 16). Subsequent to this, the logical block table preparation means 531 performs an operation as described below in each physical block B.

The logical block table preparation means 531 recognizes pages A, the lower 5 bits of whose physical address are '01000', as a target. Then, regarding the target pages, the logical block table preparation means 531 refers to the values of the flag sections 90 in those pages in descending order of physical address, and then detects a page wherein the value of the flag section 90 is valid (S1602 in FIG. 16). In this detecting step, when the page is detected for the first time, the logical block table preparation means 531 refers to the second physical address stored in the second table 80 in the detected page without executing step S1603. And the logical block C specified by the stored second physical address is registered as 'valid' in the logical block table 53 (S1604 in FIG. 16). The logical block table preparation means 531 stores the ID number retained in the first detected second table 80 into a memory 535 (S1605 in FIG. 16).

After the specified logical block C is registered as 'valid', the logical block table preparation means 531 refers to the value of the flag region regarding the target pages having physical addresses smaller than that of the first detected page in descending order of physical address, and then detects a page wherein the value of the flag section 90 in the page is valid. When another page wherein the value of the flag section 90 is valid is detected, the logical block table preparation means 531 judges whether or not the second table in this detected page has the same ID number as stored in the memory 535 (S1603 to S1604 in FIG. 16).

If the ID numbers are not the same, the logical block preparation means 531 registers the logical block C specified by the second physical address Ca in the second table 80 as 'valid' in the logical block table 53, and stores the ID number in the second table 80 in the memory 535 (S1605 in FIG. 16). On the other hand, if the ID numbers are the same, the logical block table preparation means 531 does not store the logical block C specified by the second physical address Ca in the second table 80 in the logical block table, but starts to detect a page wherein the value of the flag section 90 is valid.

As described above, the logical block table preparation means 531 registers only the logical block C corresponding to the ID number not stored in the memory 535 as 'valid' in the logical block table 53.

Then, the logical block table preparation means 531 refers to all the flag sections 90 in the target pages (S1606 in FIG. 16), and initializes the memory 53. And then, the logical block table preparation means 531 executes the above detecting steps regarding the physical blocks B from which the target pages are not detected (S1607 to S1608 in FIG. 16).

When power is turned on, the first table preparation means 511 initializes the first table 51 (S1701 in FIG. 17), and processes each psychical block B in a manner similar to the logical block table preparation means 531, which processing is as follows.

Figure 17:
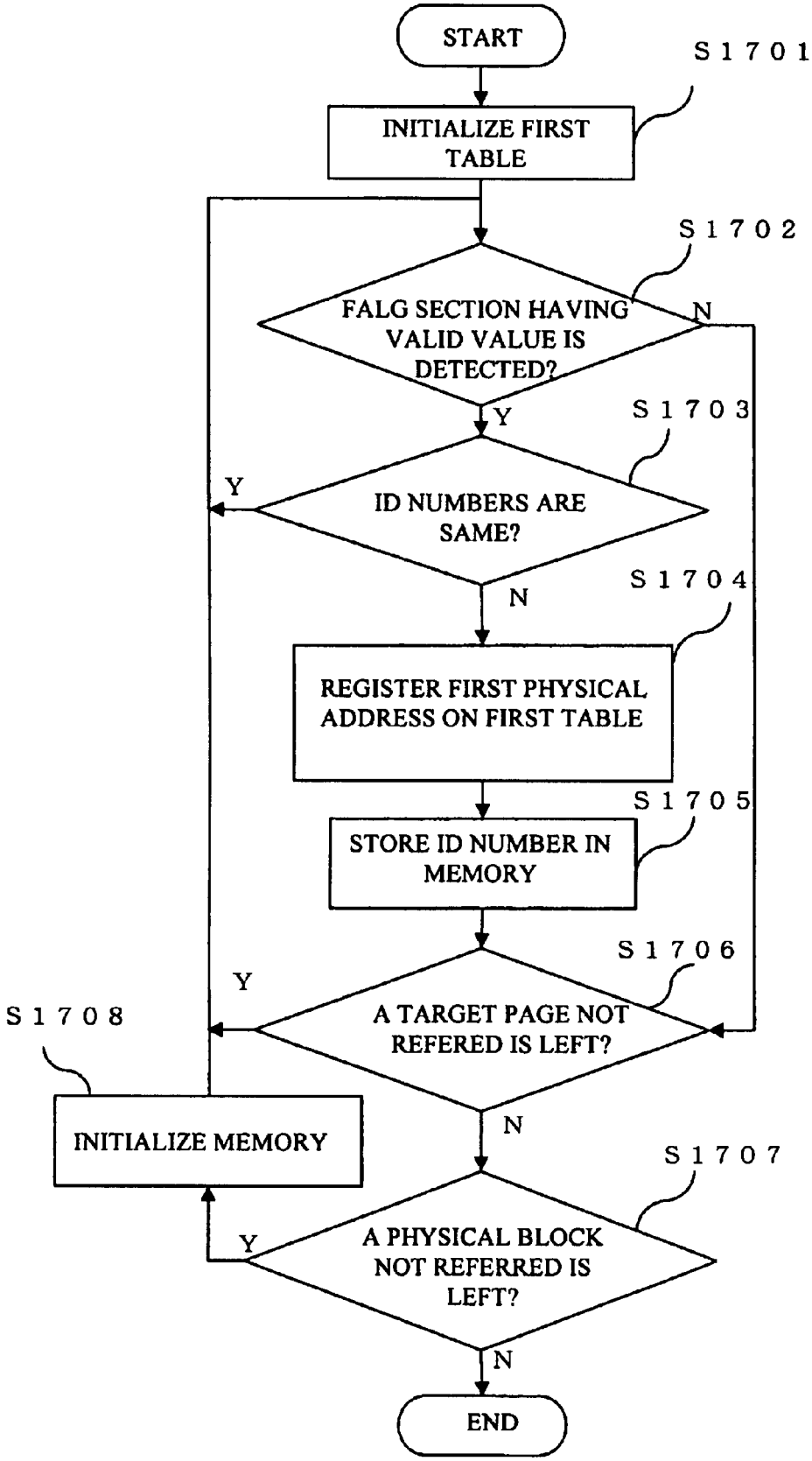
FIG. 17 is a flowchart showing a concrete example of a procedure for preparing a first table.

Regarding the target pages in a specific physical block B, the first table preparation means 511 refers to the values of the flag sections 90 sequentially in descending order of physical address of the target page, and then detects a page wherein the value of the flag section 90 is valid (S1702 in FIG. 17). In this detecting step, when the page is detected for the first time, the first table preparation means 511 goes to step S1704 without executing step S1703. That is, the first table preparation means 511 registers as the first physical address the specific 16 bits of the physical address of the detected page into the field 50 indicated by the ID number in the second table 80 on the detected page (S1704 in FIG. 17). And the ID number retained in the second table in the detected page is stored in a memory 515 the first table preparation means 511 (S1705 in FIG. 17).

After the detected page's physical address is registered as the first physical address, the first table preparation means 511 refers to the values of the flag regions 90 regarding the target pages having physical addresses smaller than that of the first detected page, in descending order of physical address, and then detects a page wherein the value of the flag section 90 in the page is valid. When another page wherein the value of the flag section 90 is valid is detected, the first table preparation means 511 judges whether or not the second table 80 in this detected page has the same ID number as stored in the memory 515 (S1703 to S1704 in FIG. 17).

If it is determined as not the same, the first table preparation means 511 registers as the first physical address the specific 16 bits of the physical address of the detected page storing the second table 80 into the field 50 indicated by the ID number in the second table 80. Then, the ID number in the second table on the first detected page is stored into the memory 515 by the first table preparation means 511 (S1705 in FIG. 17). If it is determined as the same, the first table preparation means 511 does not register the specific 16 bits (the first physical address) of the physical address of the detected page into the field 50 indicated by the ID number in the second table 80.

As described above, in the field 50 specified by the ID number in the memory 515, the first table preparation means 511 registers as the first physical address only the specific 16 bits of the physical address of the target page storing the second table 80 with the ID number not stored in the memory 515.

The first table preparation means 511 refers to all the target pages of the specific physical block B (S1706 in FIG. 17), and initializes the memory 515, and executes the above detecting steps regarding the physical blocks B from which the target pages are not detected (S1707 to S1708 in FIG. 17).

In a way as described above, the logical block table preparation means 531 prepares the logical block table 53, while the first table preparation means 511 prepares the first table 51. Therefore, when a rewrite table is written into the same physical block B as that storing the invalid table, it is possible to prepare the logical block table 53 and the first table 51 without updating the value of the flag section 90 corresponding to the invalid table to an invalid value.

Note that the above conditions allows that, for example, if the physical address of a page A storing the invalid table contains a page having the physical address which is smaller than that of the page A and includes the specific 5 bits—'01000', the writing means 100 may write a rewrite data into the detected page. If no page satisfies the condition, the writing means 100 determines a write-target page A to which the rewrite data is written, by selecting the page having the largest physical address from those pages that belongs to the specific physical block B other than that storing the invalid table, and have the physical addresses including the specific 5 bits '01000'.

When the page into which rewrite data is written is determined under such conditions, the logical block table preparation means 531 and the first table preparation means 511 is to refer to the flag section 90 sequentially from the target page having the smallest physical address.

As described above, the memory device of the present invention can convert a logical address to a physical address by using the first table and the second table, which makes it possible to reduce a capacity of the first table provided to RAM. Therefore, a compact memory device with a large capacity can be realized.

Moreover, the memory device of the present invention can access all pages contained in a logical block at high speed by writing physical addresses of physical blocks formed on the logical block into a specific page contained in the logical block as the chain information.

According to the state of physical block in which data has been written, a page to write data therein and a physical block to be erased are selected. The data writing or data erasing can be efficiently performed. Only when the rewrite table is written into a physical block different from the invalid table, a value of a flag section of the invalid table is updated to an invalid value. Thereby, the wringing can be performed at high speed.

Moreover, by setting a state of a defective physical block indicated by a physical block table to a valid state, a delay of writing can be suppressed. This makes it possible to access data at high speed. In addition, by setting a state of a logical block in the logical block table corresponding to a defective block to a valid state, a delay of erasure can be suppressed. As a result, the high speed data access can be realized.

What is claimed is:

[1. An address conversion unit for a memory device including a nonvolatile memory and RAM to be used to access the nonvolatile memory, the nonvolatile memory capable of erasing data in blocks and writing data in pages contained in a physical block, comprising:

a first table on RAM to convert the specific number of bits of a logical address to a first physical address, the first physical address indicating a location of a second table;

the second table on the nonvolatile memory to convert the other bits of the logical address to a second physical address, the second physical address being information to specify a physical address of a representative page of pages in the logical block specified by the logical address; and an access unit operable to access the nonvolatile memory in accordance with the logical address, wherein the access unit comprises:

a unit operable to obtain the first physical address from the first table in accordance with the specific nunber of bits of the logical address:

a unit operable to specify the second table by means of the obtained first physical address;

a unit operable to obtain the second physical address from the specified second table in accordance with the other bits of the logical address; and a unit operable to access the nonvolatile memory by means of the obtained second physical address.]

[2. The address conversion unit for the memory device according to claim 1, wherein the access unit comprises a writing unit, a reading unit, and an erasing unit.]

[3. The address conversion unit for the memory device according to claim 2, wherein the writing unit writes the second physical address into the second table at the time of forming the logical blocks on the nonvolatile memory.]

[4. The address conversion unit for the memory device according to claim 2, wherein the writing unit, at the time of forming the logical blocks on the nonvolatile memory, comprises:

a unit operable to invalidate the original second table in a specific page;

a unit operable to update the second table based on the information specifying the physical address of the representative page;

a unit operable to copy the updated second table to other pages; and a unit operable to write the information specifying the physical addresses of the other pages into the first table as the first physical addresses.]

[5. The address conversion unit for the memory device according to claim 4, wherein the other pages are contained in a physical block different from the physical block storing the original second table.]

[6. The address conversion unit for the memory device according to claim 5, further comprising a first table preparation unit operable to prepare the first table on the basis of the physical address of the second table detected first as being not invalidated from the plural second tables having a same ID number indicating a field of the first table within the same physical block.]

[7. The address conversion unit for the memory device according to claim 4, further comprising a first table preparation unit operable to prepare the first table on the basis of the physical address of the second table that is not invalidated.]

[8. The address conversion unit for the memory device according to any one of claims 4, 5, 7 and 6, wherein the page storing the second table is provided with a flag section storing a flag representing whether or not the second table is valid or invalid.]

[9. The address conversion unit for the memory device according to claim 2, further comprising:

a physical block table for indicating a state of a physical block in the nonvolatile memory;

an entry counter for indicating a volume of data written into the physical block;

an address register for indicating the addresses of pages contained in a logical block; and a writing unit operable to form new logical blocks on the nonvolatile memory on the basis of contents of the physical block table, the address register and the entry counter.]

[10. The address conversion unit for the memory device according to claim 9, wherein the writing unit updates the physical block table, the address register, the entry counter, and the logical block table representing the state of the logical block, on the basis of states of the logical blocks newly formed.]

[11. The address conversion unit for the memory device according to claim 9, wherein the erasing unit erases data stored in a specific physical block, on the basis of contents of the logical block table, the physical block table and the address register.]

[12. The address conversion unit for the memory device according to claim 9, further comprising a physical block table preparation unit operable to judge whether or not the physical block stores data, and preparing the physical block table on the basis of the judgment result.]

[13. The address conversion unit for the memory device according to claim 9, further comprising:

a defective physical block judgment unit operable to judge whether or not the physical block is defective; and a use state setting unit, when the physical block is determined to be defective by the defective physical block judgment unit, operable to set the state of the physical block to an occupied state in the physical block table.]

[14. The address conversion unit for the memory device according to claim 9, further comprising:

a defective physical block judgment unit operable to judge whether or not the physical block is defective; and a valid state setting unit, when the physical block is determined to be defective by the defective physical block judgment unit, operable to set the state of the logical block corresponding to the physical block to a valid state in the logical block table.]

[15. The address conversion unit for the memory device according to claim 1, further comprising a first table preparation unit operable to prepare the first table on the basis of an ID number retained in the second table and the physical address of the second table.]

[16. The address conversion unit for the memory device according to claim 1, further comprising a logical block table preparation unit operable to prepare a logical block table on the basis of a flag, the logical block representing a state of the logical block containing the representative page of which the physical address is specified by the second physical address, the flag representing whether or not the second table storing the second physical address is valid or invalid.]

[17. An address conversion unit for a memory device comprising:

a table for obtaining from a logical address a physical address of a representative page of pages contained in a logical block formed on a nonvolatile memory, the logical block being a data block indicated by the logical address, and the page being provided with a data area storing data and a management area storing management information for managing the data; and a writing unit operable to write chain information for obtaining physical addresses of other pages contained in the same as the logical block storing the representative page, wherein the table comprises:

a first table for obtaining a first physical address on the nonvolatile memory corresponding to the specific number of bits of the logical address; and a second table stored in the management area in the page specified by the first physical address and for obtaining the physical address of the representative page on the basis of the other bits of the logical address, wherein the management information is the second table.]

[18. The address conversion unit for the memory device according to claim 17, wherein the writing unit writes respective chain information stored in pages into each management area in one and more pages in the same logical block.]

[19. The address conversion unit for the memory device according to claim 17, wherein the management information is specific number or more of other chain information pieces.]

[20. The address conversion unit for the memory device according to claim 17, further comprising a reading unit operable to read the logical block onto buffers on the basis of the physical address of the representative page and the chain information.]

*21. A storage device comprising:*

*one or more nonvolatile memories containing a plurality of physical blocks, each of said plurality of physical blocks including a plurality of pages;*

*a logical block managing section configured to (1) manage a logical block such that portions of the logical block are respectively assigned to portions of the respective physical blocks and each of the portions of the logical block includes a prescribed number of the pages of corresponding one of the physical blocks, and (2) assign logical addresses to said logical block;*

*an address managing section configured to specify storage locations of said portions of the respective physical blocks based on said logical addresses;*

*a data write/read section configured to perform data write/read to said one or more nonvolatile memories according to the specified storage locations of said portions of the respective physical blocks;*

*a logical block table configured to indicate whether a state of data associated with the logical block is valid or invalid, the data being retained in the portions, to which the logical block is assigned, of the respective physical blocks; and*

*an erasing section configured to select a physical block in accordance with the logical block table, and erase data of the selected physical block, wherein*

*a physical block includes portions to which logical blocks are assigned, and*

*when the number of valid logical blocks among the logical blocks assigned to the physical block is less than a prescribed number, the erasing section selects the physical block to erase data retained therein.*

*22. The storage device according to claim 21, wherein said logical addresses assigned to the logical block are associated with pages in the portions of the respective physical blocks, said logical addresses being non-continuous in the respective physical blocks.*

*23. The storage device according to claim 21, further comprising a table specifying the storage locations of the plurality of physical blocks, wherein*

*said address managing section is configured to specify the storage locations of said portions of the respective physical blocks based on said table.*

*24. The storage device according to claim 21, wherein said portions of the respective physical blocks to which the portions of the logical block are respectively assigned, are located in mutually identical physical locations within the respective physical blocks to each other.*

*25. The storage device according to claim 21, wherein said logical block managing section is configured to respectively assign the portions of the logical block to portions of respective three or more physical blocks.*

*26. The storage device according to claim 21, wherein*

*said one or more nonvolatile memories contain a first table which has information on the storage locations of said portions of the respective physical blocks, and*

*said address managing section contains a second table which has information on the storage location of said first table, said address managing section specifying the storage locations of said portions of the respective physical blocks by referring to said second table based on said logical addresses and based on the second table, referring to said first table.*

*27. The storage device according to claim 21, wherein said logical block managing section is configured to, responsive to reception of a write request and logical addresses from a data input/output device, (3) select said plurality of physical blocks to which said logical block is assigned, (4) generate chain information for tracing pages of said respective physical blocks to which the logical block are assigned, and (5) write said chain information to said one or more nonvolatile memories.*

*28. The storage device according to claim 27, wherein said logical block managing section writes a plurality of said chain information into at least one of the pages included in the logical block.*

*29. The storage device according to claim 21 wherein when the data of the selected physical block is erased, data associated with a valid logical block is saved in another physical block.*

*30. A storage device comprising:*

*one or more nonvolatile memories containing a plurality of physical blocks, each of said plurality of physical blocks including a plurality of pages;*

*a logical block managing section configured to (1) select write physical blocks to which data is to be written, from said plurality of physical blocks, (2) manage a logical block such that portions of the logical block are respectively assigned to portions of the respective write physical blocks and each of the portions of the logical block includes a prescribed number of the pages of corresponding one of the write physical blocks, and (3) assign logical addresses to said logical block;*

*an address managing section configured to specify storage locations of said portions of the write physical blocks based on said logical addresses;*

*a data write/read section configured to perform data write/read to said one or more nonvolatile memories according to the specified storage locations of said portions of the write physical blocks;*

*a logical block table configured to indicate whether a state of data associated with the logical block is valid or invalid, the data being retained in the portions, to which the logical block is assigned, of the respective write physical blocks; and*

*an erasing section configured to select a write physical block in accordance with the logical block table, and erase data of the selected write physical block, wherein*

*a write physical block includes portions to which logical blocks are assigned, and*

*when the number of valid logical blocks among the logical blocks assigned to the write physical block is less than a prescribed number, the erasing section selects the write physical block to erase data retained therein.*

*31. The storage device according to claim 30, wherein said logical addresses assigned to the logical block are associated with pages in the portions of the respective write physical blocks, said logical addresses being non-continuous in the respective write physical blocks.*

*32. The storage device according to claim 30, further comprising a table specifying the storage locations of the plurality of physical blocks, wherein*

*said address managing section is configured to specify the storage locations of said portions of the respective write physical blocks based on said table.*

*33. The storage device according to claim 30, wherein said portions of the respective write physical blocks to which the portions of the logical block are respectively assigned, are located in mutually identical physical locations within the respective physical blocks to each other.*

*34. The storage device according to claim 30, wherein said logical block managing section is configured to respectively assign the portions of the logical block to portions of respective three or more write physical blocks.*

*35. The storage device according to claim 30 wherein*

*said one or more nonvolatile memories contain a first table which has information on the storage locations of said portions of the respective write physical blocks, and*

*said address managing section contains a second table which has information on the storage location of said first table, said address managing section specifying the storage locations of said portions of the respective write physical blocks by referring to said second table based on said logical addresses and based on the second table, referring to said first table.*

*36. The storage device according to claim 30, wherein said logical block managing section is configured to, responsive to reception of a write request and logical addresses from a data input/output device, (4) select said write physical blocks to which said logical block is assigned, (5) generate chain information for tracing pages of said respective write physical blocks to which the logical block are assigned, and (6) write said chain information to said one or more nonvolatile memories.*

*37. The storage device according to claim 36, wherein said logical block managing section writes a plurality of said chain information into at least one of the pages included in the logical block.*

*38. The storage device according to claim 30 wherein when the data of the selected write physical block is erased, data associated with a valid logical block is saved in another physical block.*

*39. A method for managing a storage device including one or more nonvolatile memories containing a plurality of physical blocks, each of said plurality of physical blocks including a plurality of pages, said method comprising:*

*selecting write physical blocks to which data is to be written, from said plurality of physical blocks;*

*managing a logical block such that portions of the logical block are respectively assigned to portions of the respective write physical blocks and each of the portions of the respective write physical blocks includes a prescribed number of the pages of corresponding one of the write physical blocks;*

*assigning logical addresses to said logical block;*

*specifying storage locations of said portions of the write physical blocks based on said logical addresses;*

*performing data write/read to said one or more nonvolatile memories according to the specified storage locations of said portions of the write physical blocks;*

*managing a logical block table configured to indicate whether a state of data associated with the logical block is valid or invalid, the data being retained in the portions, to which the logical block is assigned, of the respective write physical blocks; and*

*selecting a write physical block in accordance with the logical block table, and erasing data of the selected write physical block, wherein*

*a write physical block includes portions to which logical blocks are assigned, and*

*when the number of valid logical blocks among the logical blocks assigned to the write physical block is less than a prescribed number, the write physical block is selected to erase data retained therein.*

*40. The method according to claim 39, wherein said logical addresses assigned to the logical block are associated with pages in the portions of the respective write physical blocks, said logical addresses being non-continuous in the respective write physical blocks.*

*41. The method according to claim 39, further comprising:*

*specifying by a table the storage locations of the plurality of physical blocks, wherein*

*specifying the storage locations of said portions of the respective write physical blocks is based on said table.*

*42. The method according to claim 39, wherein said portions of the respective write physical blocks to which the portions of the logical block are respectively assigned, are located in mutually identical physical locations within the respective physical blocks to each other.*

*43. The storage device according to claim 39 wherein when the data of the selected write physical block is erased, data associated with a valid logical block is saved in another physical block.*

* * * * *